(12) United States Patent
He et al.

(10) Patent No.: US 12,556,598 B2
(45) Date of Patent: Feb. 17, 2026

(54) MIXED MEDIA DATA FORMAT AND TRANSPORT PROTOCOL

(71) Applicant: QUALCOMM Incorporated, San Diego, CA (US)

(72) Inventors: Yong He, San Diego, CA (US); Imed Bouazizi, Frisco, TX (US); Muhammed Zeyd Coban, Carlsbad, CA (US); Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/454,992

(22) Filed: Aug. 24, 2023

(65) Prior Publication Data

US 2024/0098130 A1    Mar. 21, 2024

Related U.S. Application Data

(60) Provisional application No. 63/376,409, filed on Sep. 20, 2022, provisional application No. 63/484,571, filed on Feb. 13, 2023.

(51) Int. Cl.
*G06F 13/00* (2006.01)
*H04L 65/65* (2022.01)
*H04L 65/70* (2022.01)

(52) U.S. Cl.
CPC .............. *H04L 65/70* (2022.05); *H04L 65/65* (2022.05)

(58) Field of Classification Search
CPC ................ H04L 65/70; H04L 65/65

(Continued)

(56) References Cited

U.S. PATENT DOCUMENTS

| 11,388,427 B2 * | 7/2022 | Bouazizi | H04N 19/85 |
| 11,711,505 B2 * | 7/2023 | Mate | H04N 13/194 |
| | | | 348/43 |

(Continued)

FOREIGN PATENT DOCUMENTS

WO    WO-2024041747 A1 *    2/2024

OTHER PUBLICATIONS

3GPP TS 26.114: "3rd Generation Partnership Project, Technical Specification Group Services and System Aspects, IP Multimedia Subsystem (IMS), Multimedia Telephony, Media Handling and Interaction (Release 17)", 3GPP TS 26.114, V17.5.0, Jun. 2022, pp. 1-480.

(Continued)

*Primary Examiner* — Kenneth R Coulter
(74) *Attorney, Agent, or Firm* — QUALCOMM Incorporated

(57) ABSTRACT

An example device for processing media data includes a memory configured to store media data; and a processing system comprising one or more processors implemented in circuitry, the processing system being configured to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

30 Claims, 24 Drawing Sheets

(58) Field of Classification Search
USPC .................. 709/245, 246, 217–219, 227
See application file for complete search history.

(56) References Cited

U.S. PATENT DOCUMENTS

| | | |
|---|---|---|
| 2021/0218976 A1 | 7/2021 | Bouazizi et al. |
| 2022/0021864 A1 | 1/2022 | Mate et al. |

OTHER PUBLICATIONS

Eisler M., "XDR: External Data Representation Standard", Network Working Group, RFC: 4506, May 2006, pp. 1-55.

Handley M., et al., "SDP: Session Description Protocol," Network Working Group, RFC: 4566, Obsoletes 2327, 3266, Jul. 2006, 50 Pages.

International Search Report and Written Opinion—PCT/US2023/031221—ISA/EPO—Dec. 13, 2023, 12 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Jesup R., et al., "WebRTC Data Channels", Internet Engineering Task Force (IETF), RFC: 8831, Category: Standards Track, Jan. 2021, pp. 1-14.

Jones P., et al., "Differentiated Services Code Point (DSCP) Packet Markings for WebRTC Qos", Internet Engineering Task Force, RFC: 8837, Jan. 2021, pp. 1-9.

Keranen A., et al., "Interactive Connectivity Establishment (ICE): A Protocol for Network Address Translator (NAT) Traversal", Internet Engineering Task Force, RFC: 8445, Jul. 2018, pp. 1-201.

Nokia Corporation (RAPPORTEUR1): "5G Rtp Permanent Document v. 0.0.2", 3GPP TSG SA WG4 Meeting #120e, S4-221209, , 3rd Generation Partnership Project (3GPP), Mobile Competence Centre, 650, Route Des Lucioles, F-06921 Sophia-Antipolis Cedex, France, vol. SA WG4, No. Online Meeting, Aug. 17, 2022-Aug. 26, 2022, Aug. 26, 2022, XP052272534, 5 Pages, The Whole Document.

Perkins C., et al., "Media Transport and Use of RTP in WebRTC", Internet Engineering Task Force, RFC: 8834, Jan. 2021, pp. 1-45.

Qualcomm Inc, et al., "Real-time Metadata Transport Over Data Channel", 3GPP TSG SA WG4#121, S4-221257, Toulouse, France, Nov. 14-18, 2022, pp. 1-6.

Qualcomm Inc, et al., "Real-time Metadata Transport Over Data Channel", 3GPP TSG SA WG4#121, S4-221557, Toulouse, France, Nov. 14-18, 2022, pp. 1-5.

Qualcomm Inc, et al., "Real-time Metadata Transport Over RTP", 3GPP TSG SA WG4#121, S4-221555, Toulouse, France, Nov. 14-18, 2022, pp. 1-4.

Qualcomm Inc: "Signaling the Render Pose and Other Related Information", TSG SA4 Meeting #122, S4-230359, Feb. 20-24, 2023, Athens, Greece, pp. 1-7.

Qualcomm Inc: "JSON Format for Timed Metadata", TSG SA4 Meeting #122, S4-230145, Feb. 20-24, 2023, Athens, Greece, pp. 1-7.

Qualcomm Incorporated, et al., "Real-time Metadata Transport over RTP", 3GPP TSG SA WG4#121, S4-221256, 3rd Generation Partnership Project, Mobile Competence Centre, 650, Route Des Lucioles, F-06921 Sophia-Antipolis Cedex, France, vol. 3GPP SA 4, No. Toulouse, FR, Nov. 14, 2022-Nov. 18, 2022, 5 Pages, Nov. 8, 2022, XP052225472, The Whole Document.

Schulzrinne H., et al., "RTP: A Transport Protocol for Real-Time Applications", Network Working Group, Request for Comments: 3550, No. 1889, Jul. 2003, XP003022794, The Internet Society, pp. 1-89.

Singer D., et al., "A General Mechanism for RTP Header Extensions", Internet Engineering Task Force (IETF), RFC: 8285, Obsoletes: 5285, Standard, Internet Society (ISOC) 4, Rue Des Falaises CH—1205, Geneva, Switzerland, Oct. 26, 2017, pp. 1-25, XP015122249, Sections 4.1.2, 4.2, 4.3.

Stewart R., et al., "Stream Control Transmission Protocol (SCTP) Partial Reliability Extension", Network Working Group, RFC: 3758, May 2004, pp. 1-45.

Wenger S., et al., "Extended RTP Profile for Real-time Transport Control Protocol (RTCP)-Based Feedback (RTP/AVPF)", Internet Engineering Task Force, RFC: 4585, The Internet Society, Jul. 1, 2006, XP015055018, 51 Pages, abstract p. 31, paragraph 6-p. 41.

Xiaomi (Rapporteur): "MeCAR Permanent Document v3.0", 3GPP TSG SA WG4120-e Meeting, S4-221150, 3rd Generation Partnership Project (3GPP), Mobile Competence Centre, 650, Route Des Lucioles, F-06921 Sophia-Antipolis Cedex, France, vol. SA WG4, No. e Meeting, Aug. 17, 2022-Aug. 26, 2022, Aug. 26, 2022, XP052272479, 30 Pages, The Whole Document.

\* cited by examiner

MIXED MEDIA DATA FORMAT AND TRANSPORT PROTOCOL

This application claims the benefit of U.S. Provisional Application No. 63/376,409, filed Sep. 20, 2022, and of U.S. Provisional Application No. 63/484,571, filed Feb. 13, 2023, the entire contents of each of which is hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques related to real time communication protocols, such as WebRTC (Web Real-Time Communication). WebRTC may be performed over Real-time Transport Protocol (RTP). A WebRTC session may be used to exchange multiple streams of media data, such as audio, video, and/or extended reality (XR), such as augmented reality (AR), mixed reality (MR), or virtual reality (VR). For example, users may wish to have a communication session including mixed media types in which virtual avatars are represented in a virtual environment, and each user may be represented by one of the virtual avatars. In such a context, synchronizing presentation of media of two or more media streams during playback may improve user experience. For example, it may be desirable to animate the face of an avatar in a manner that accurately represents voice data from a corresponding user, and thus, it may be important to synchronize the animation data with the sound data. This disclosure describes various techniques that may be used in conjunction with, e.g., RTP, to support various media types. In particular, this disclosure describes a transport protocol and payload format that may support various media types, e.g., for real time communication. In this manner, synchronization between various media presentations transported using, e.g., RTP, may be achieved.

In one example, a method of processing media data includes: determining one or more user interactions with a virtual scene, each of the one or more user interactions corresponding to a particular media type of one or more media types; constructing a packet including data for a media communication session, the packet including header data indicating the one or more media types for the one or more user interactions and one or more attributes for each of the one or more media types; and sending the packet to a device involved in the media communication session.

In another example, a device for processing media data includes a memory configured to store media data; and a processing system comprising one or more processors implemented in circuitry, the processing system being configured to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

In another example, a device for processing media data includes: means for determining one or more user interactions with a virtual scene, each of the one or more user interactions corresponding to a particular media type of one or more media types; means for constructing a packet including data for a media communication session, the packet including header data indicating the one or more media types for the one or more user interactions and one or more attributes for each of the one or more media types; and means for sending the packet to a device involved in the media communication session.

In another example, a computer-readable storage medium has stored thereon instructions that, when executed, cause a processor to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

The details of one or more examples are set forth in the accompanying drawings and the description below. Other features, objects, and advantages will be apparent from the description and drawings, and from the claims.

DETAILED DESCRIPTION

In general, this disclosure describes techniques related to transport of immersive metadata. Third Generation Partnership Project (3GPP) Media Capability for Augmented Reality (MeCAR) permanent document (3GPP TSG SA WG4 S4-221150, "MeCAR Permanent Document v3.0," August 2022) and 5G_RTP permanent document (3GPP TSG SA WG4 S4-221209, "5G_RTP Permanent Document v0.0.2," August 2022) define a number of augmented reality (AR) and mixed reality (MR) media types (metadata). Some interactive media types, such as user pose, viewport, gesture, body action, and facial expression, are exchanged between users in real-time with low-latency requirements. Some of the media types may be synchronized with each other or with other media in real-time such as viewport and body action for the gaming applications. The mechanism for transporting these interactive media types is important for the immersive real-time communication (RTC) being explored in 3GPP SA4.

More particularly, this disclosure describes techniques related to real time communication protocols, such as WebRTC (Web Real-Time Communication). WebRTC may be performed over Real-time Transport Protocol (RTP). A WebRTC session may be used to exchange multiple streams of media data, such as audio, video, and/or extended reality (XR), such as augmented reality (AR), mixed reality (MR), or virtual reality (VR). For example, users may wish to have a communication session including mixed media types in which virtual avatars are represented in a virtual environment, and each user may be represented by one of the virtual avatars. In such a context, synchronizing presentation of media of two or more media streams during playback may improve user experience. For example, it may be desirable to animate the face of an avatar in a manner that accurately represents voice data from a corresponding user, and thus, it may be important to synchronize the animation data with the sound data. This disclosure describes various techniques that may be used in conjunction with, e.g., RTP, to support various media types. In particular, this disclosure describes a transport protocol and payload format that may support various media types, e.g., for real time communication. In this manner, synchronization between various media presentations transported using, e.g., RTP, may be achieved.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

Figure 1:
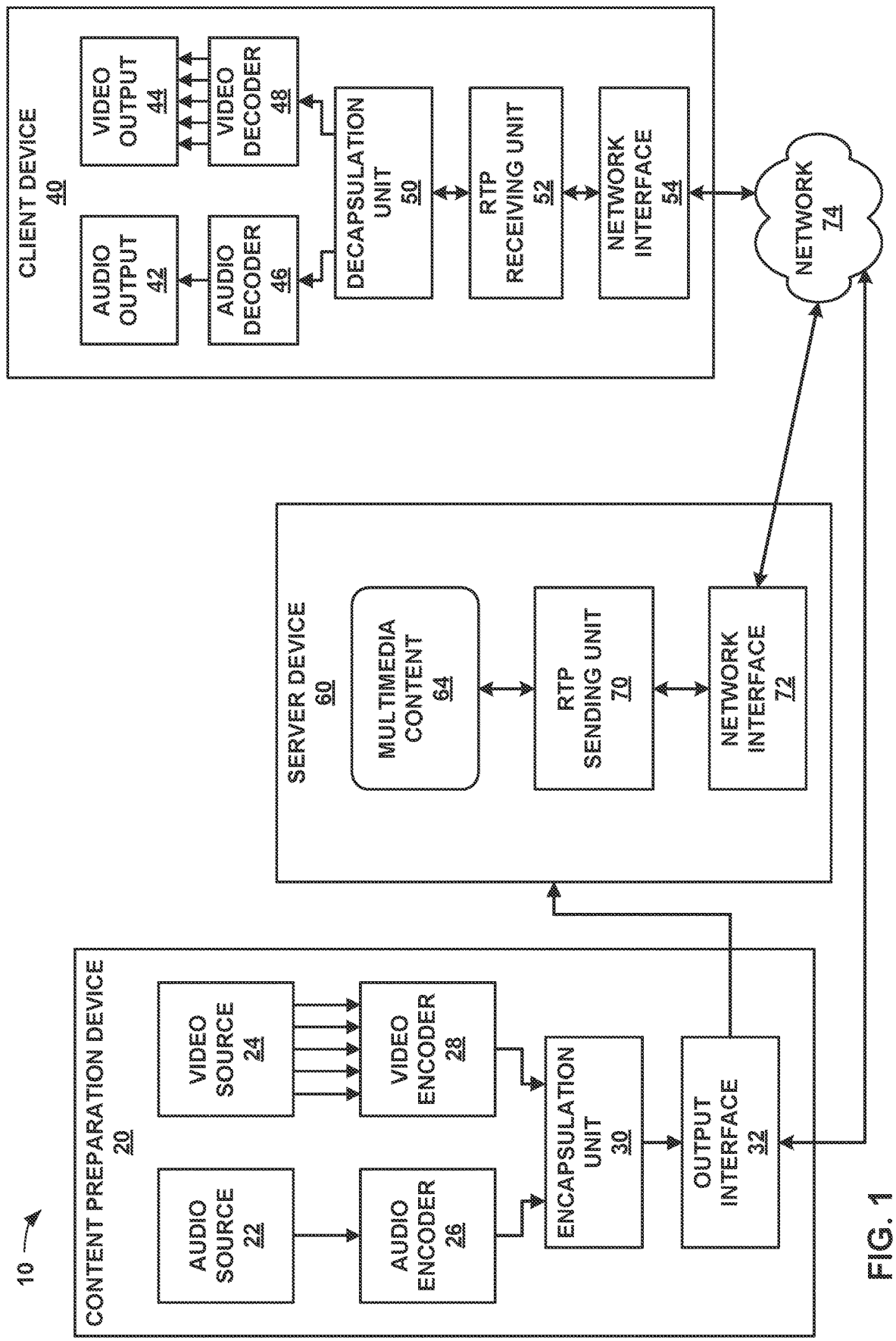
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

In some examples, the techniques of this disclosure may be achieved by two user equipment (UE) devices in communication via, e.g., network 74. In such cases, both UE devices may include components similar to those of content preparation device 20, server device 60, and client device 40. When one UE device is sending media data, that UE device may perform the functionality attributed to content preparation device 20 and server device 60, and the other UE device that is receiving media data may perform the functionality attributed to client device 40. Both sending and receiving of media data may be performed by each of the UE devices in parallel.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) sending unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP unit 70 is configured to deliver media data to client device 40 via network 74 according to RTP, which is standardized in Request for Comment (RFC) 3550 by the Internet Engineering Task Force (IETF). RTP unit 70 may also implement protocols related to RTP, such as RTP Control Protocol (RTCP), Real-time Streaming Protocol (RTSP), Session Initiation Protocol (SIP), and/or Session Description Protocol (SDP). RTP unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP unit 50 may receive an RTSP describe request from, e.g., client device 40. The RTSP describe request may include data indicating what types of data are supported by client device 40. RTP unit 50 may respond to client device 40 with data indicating media streams, such as media content 64, that can be sent to client device 40, along with a corresponding network location identifier, such as a uniform resource locator (URL) or uniform resource name (URN).

RTP unit 50 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP unit 50 may reply to the RTSP setup request with a confirmation and data representing ports of server device 60 by which the RTP data and control data will be sent. RTP unit 50 may then receive an RTSP play request, to cause the media stream to be "played," i.e., sent to client device 40 via network 74. RTP unit 50 may also receive an RTSP teardown request to end the streaming session, in response to which, RTP unit 50 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP unit 50 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC) Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

According to the techniques of this disclosure, client device 40 and server device 60 may be engaged in a media communication session, such as an XR session. Client device 40 may represent a UE, while server device 60 may represent another UE or an edge server or other server device. As part of the media communication session, a user of client device 40 may interact with a virtual scene, e.g., by moving, changing a viewport/look direction, interacting with objects, speaking, or the like. Various interactions may correspond to different types of media data, e.g., audio, visual, changing virtual scene objects, or changing the user's perspective of the virtual scene.

In general, to communicate such interactions, client device 40 may form a packet, e.g., an RTP packet, including media data representing the interactions, as well as header information indicating media types for the interactions. In this manner, server device 60 can use the header information to determine a number of sets of media data that will be included in the packet, types of the media data, and then extract the media data from the packet. The header information may correspond to an RTP header extension, as discussed in greater detail below. The header information may further include attributes for each of the media types.

Figure 2:
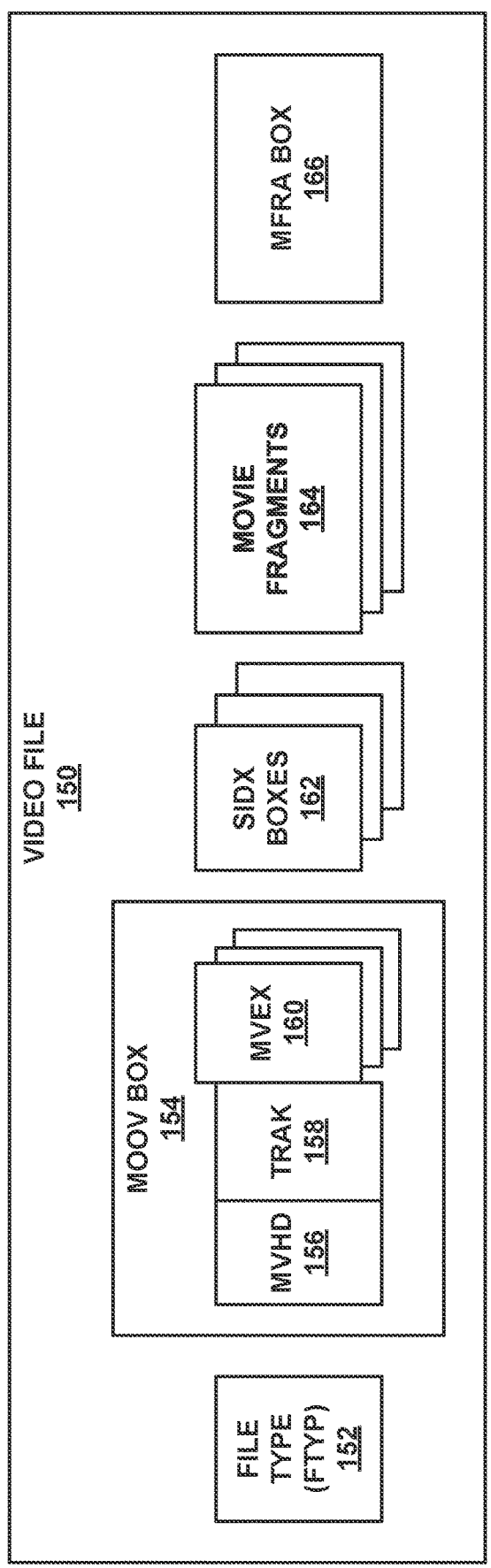
FIG. 2 is a block diagram illustrating elements of an example video file.

FIG. 2 is a block diagram illustrating elements of an example video file 150. As described above, video files in accordance with the ISO base media file format and extensions thereof store data in a series of objects, referred to as "boxes." In the example of FIG. 2, video file 150 includes file type (FTYP) box 152, movie (MOOV) box 154, segment index (sidx) boxes 162, movie fragment (MOOF) boxes 164, and movie fragment random access (MFRA) box 166. Although FIG. 2 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 2, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 2). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 3:
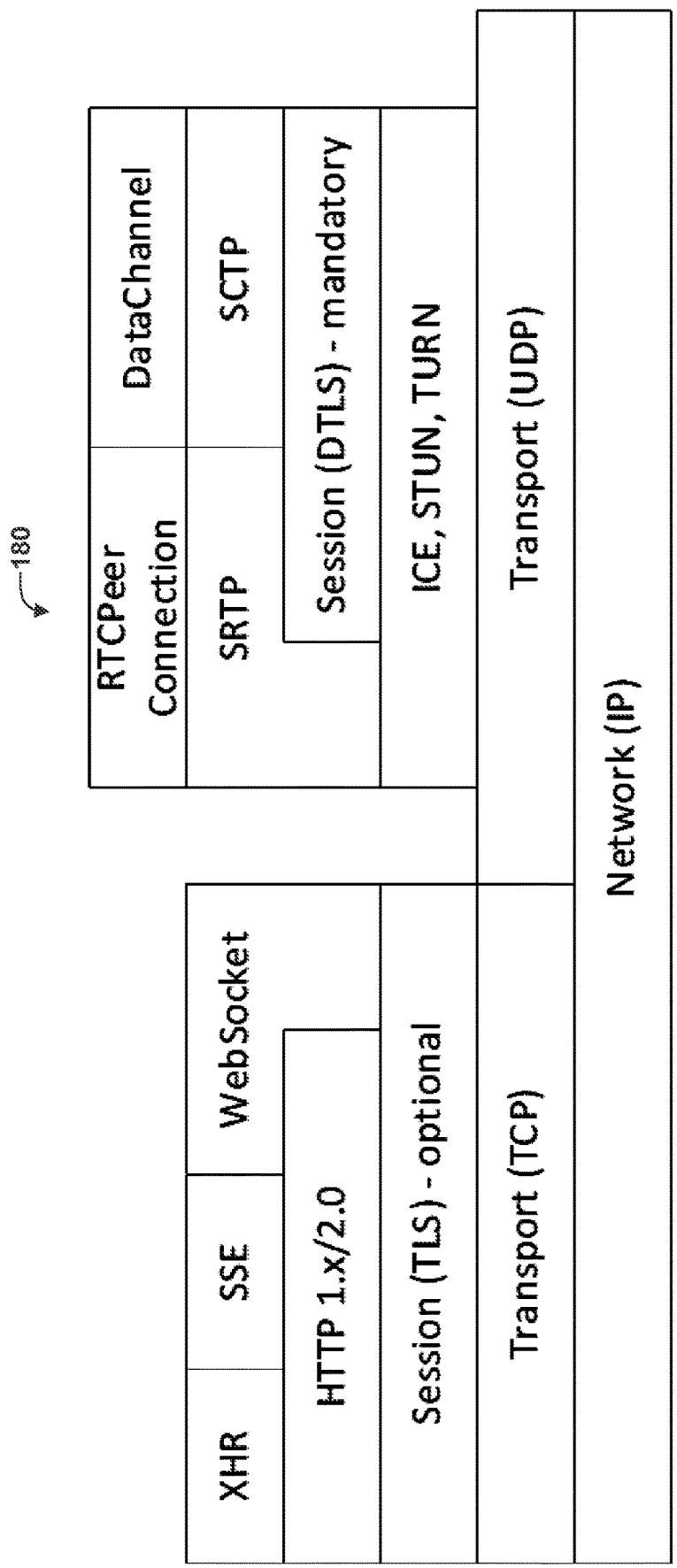
FIG. 3 is a conceptual diagram illustrating an example Web Real-Time Communication (WebRTC) protocol stack.

FIG. 3 is a conceptual diagram illustrating an example Web Real-Time Communication (WebRTC) protocol stack 180. WebRTC is a protocol suite support direct, interactive, RTC using audio, video, collaboration, games, etc. between web browsers, or between browsers and other entities. FIG. 3 shows an example WebRTC protocol stack 180. In the WebRTC framework, communication between the parties consists of media (for example, audio and video) and non-media data. Media is sent using the Secure Real-time Transport Protocol (SRTP), and non-media data is handled by using the Stream Control Transmission Protocol (SCTP). The priority associated with a media flow or data flow is classified as "very-low," "low," "medium," or "high" in the API. WebRTC implementations may attempt to set QoS on the packet sent according to the guidelines in IETF RFC8837, "Differentiated Services Code Point (DSCP) Packet Markings for WebRTC QoS."

Figure 4:
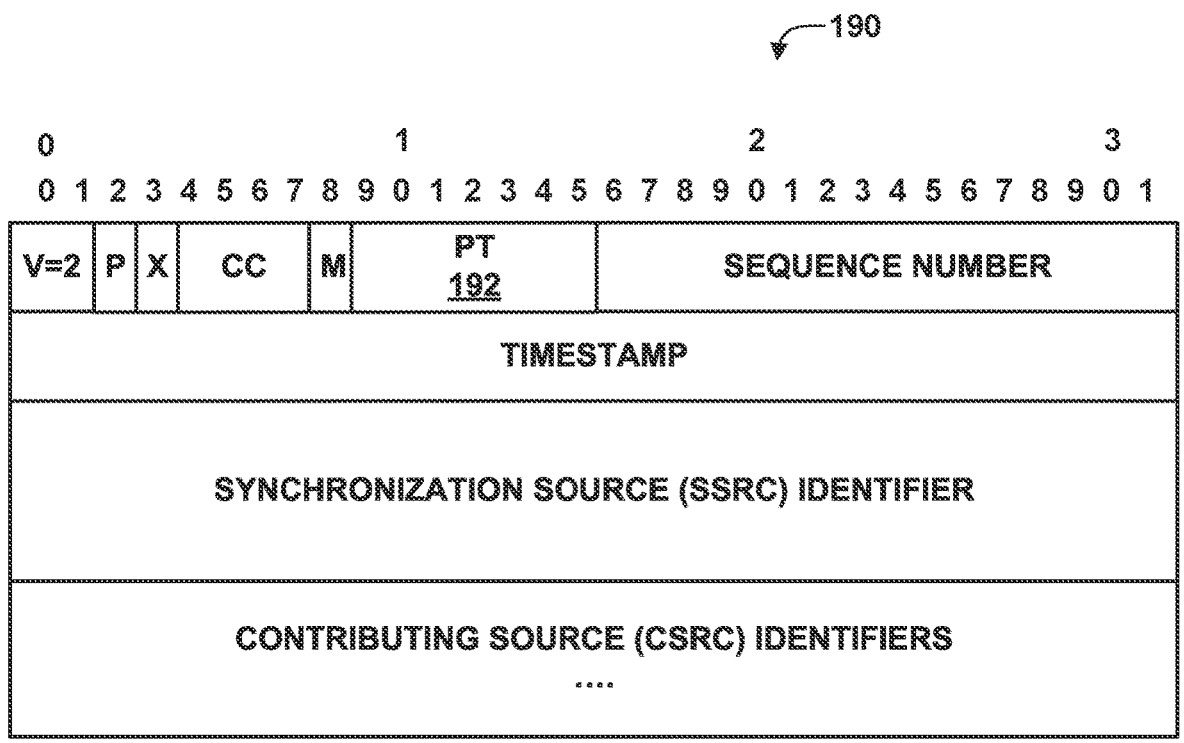
FIG. 4 is a conceptual diagram illustrating a Real-time Transport Protocol (RTP) header format.

FIG. 4 is a conceptual diagram illustrating an RTP header format 190. RTP header format 190 of FIG. 4 is defined in IETF RFC3550, "RTP: A Transport Protocol for Real-Time Applications," July 2003. As shown in FIG. 4, RTP header format 190 includes payload type (PT) field 192. Per RFC 3350, PT field 192 has a value that identifies the format of the RTP payload and determines its interpretation by the application. For example, a static PT value 31 indicates H.261 video coding.

A dynamic payload type may be defined through other protocols. For example, an RTP packet stream can be associated with an SDP "m=" line by comparing the RTP payload type numbers used by the RTP packet stream with payload types signaled in the "a=rtpmap:" lines in the media sections of the SDP. An example of media representation in SDP is shown below, where PT value 98 indicates ITU-T H.264/Advanced Video Coding (AVC):

m=video 49170 RTP/AVP 98
a=rtpmap:98 H.264/90000
a=fmtp:98 profile-level-id=42QA01E;
  packetization-mode=1;
  sprop-parameter-sets=<parameter sets data>

Figure 5:
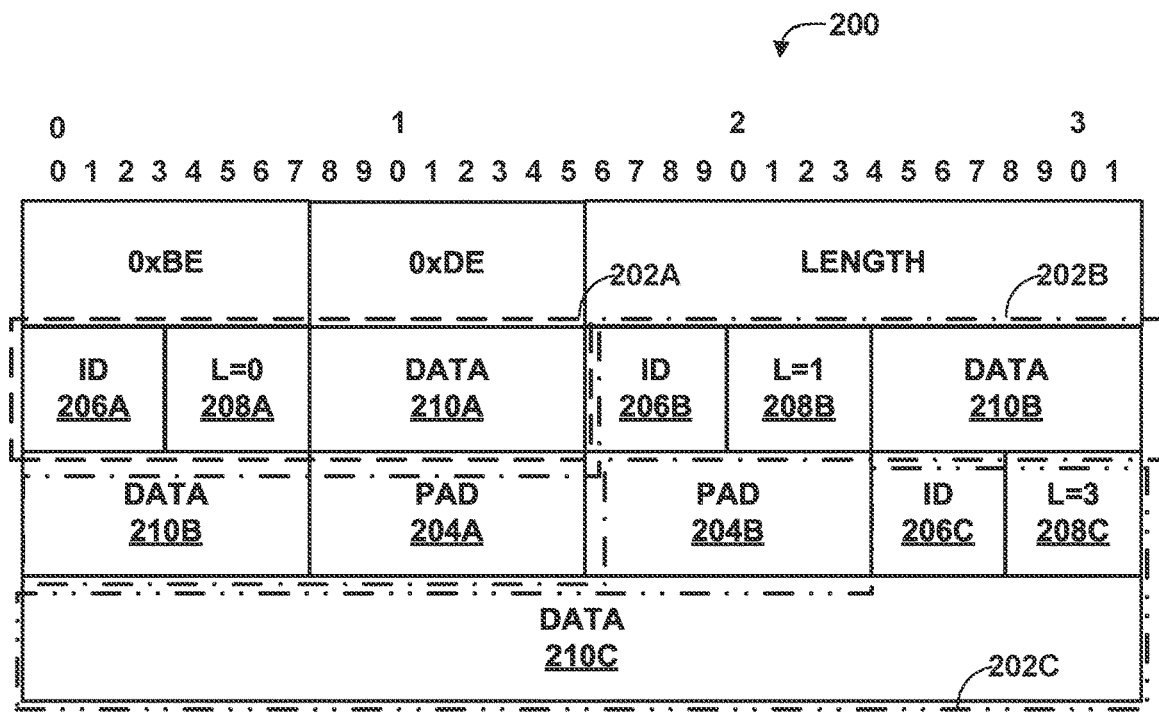
FIG. 5 is a conceptual diagram illustrating an example RTP header extension.

FIG. 5 is a conceptual diagram illustrating an example RTP header extension 200. RTP provides an extension mechanism to carry additional information in the RTP packet header. If the extension (X) bit in the RTP header is one, a variable-length header extension must be appended to the RTP header, following the CSRC list if present. Two types of RTP header extension were defined in IETF RFC8285, "A General Mechanism for RTP Header Extensions," October 2017. The one-byte header form of extension has a fixed first 16-bit bit pattern 0xBEDE, and each extension element starts with a byte containing an ID and a length. The 4-bit length is the number of data bytes, minus one, of this header extension element following the one-byte header.

FIG. 5 depicts an example of a one-byte header extension with three extension elements 202A, 202B, 202C, and padding data 204A, 204B. In particular, extension element 202A includes ID 206A, length value 208A, and data 210A; extension element 202B includes ID 206B, length value 208B, and data 210B; and extension element 202C includes ID 206C, length value 208C, and data 210C.

Figure 6:
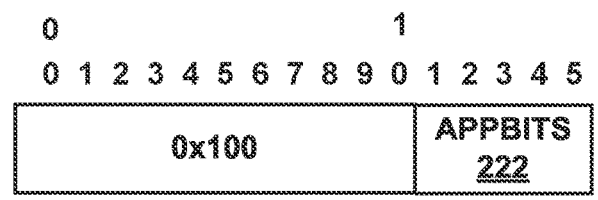
FIG. 6 is a conceptual diagram illustrating an example of a two-byte header form.

FIG. 6 is a conceptual diagram illustrating an example of a two-byte header form 220. In particular, the example of FIG. 6 is a two-byte (16-bit) RTP header field. In this example, the four-bit "appbits" field 222 may have an application-dependent value and may be defined to have any value or meaning.

Figure 7:
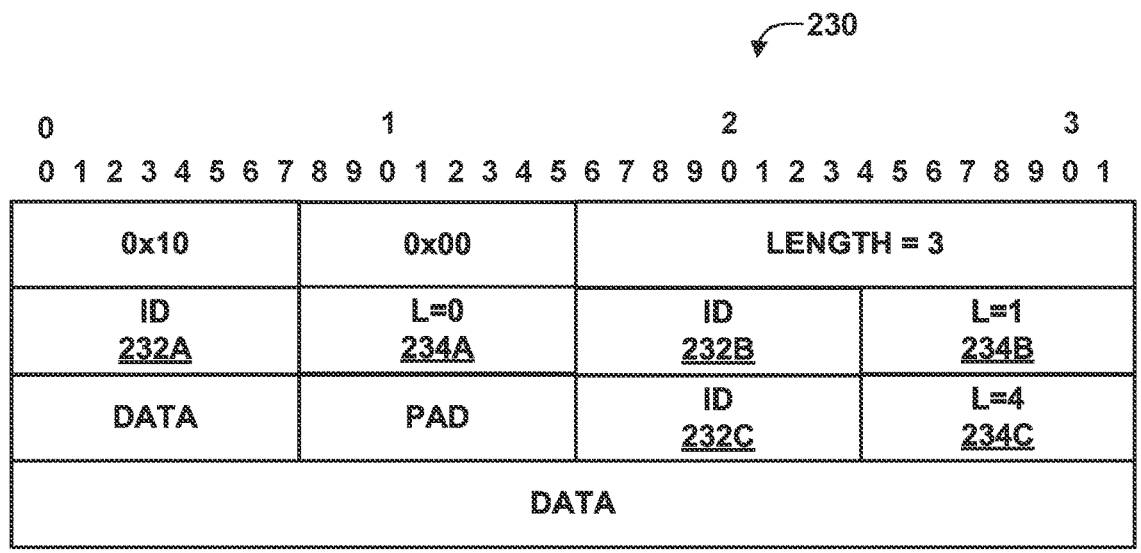
FIG. 7 is a conceptual diagram illustrating an example of a two-byte RTP header extension.

FIG. 7 is a conceptual diagram illustrating an example of a two-byte RTP header extension 230. Each RTP header extension element may start with a byte of data including an identifier (ID) 232A, 232B, 232C and another byte of data containing a length value 234A, 234B, 234C.

Per RFC 3550, RTP header extensions are to be used for data that can safely be ignored by the recipient without affecting interoperability.

WebRTC supports extensions such as client-to-mixer audio level, Mixer-to-Client Audio Level, Media Stream Identification, and Coordination of Video Orientation. WebRTC sends all types of media in a single RTP session and uses RTP and RTCP multiplexing to further reduce the number of UDP ports needed (IETF RFC8834, "Media Transport and Use of RTP in WebRTC," January 2021). RTP allows for modification of the RTP header or definition of additional fixed functional fields to follow immediately after the SSRC field of the existing fixed header in a profile specification.

RTP control protocol (RTCP) is based on the periodic transmission of control packets to all endpoints in the session. The fraction of the session bandwidth added for RTCP may be fixed at 5%. The low-delay RTCP feedback (FB) messages are classified into three categories, per IETF RFC4585, "Extended RTP Profile for Real-time Transport Control Protocol (RTCP)-Based Feedback (RTP/AVPF)," July 2006, as follows: transport layer FB messages, payload-specific FB messages, and application layer FB messages.

Figure 8:
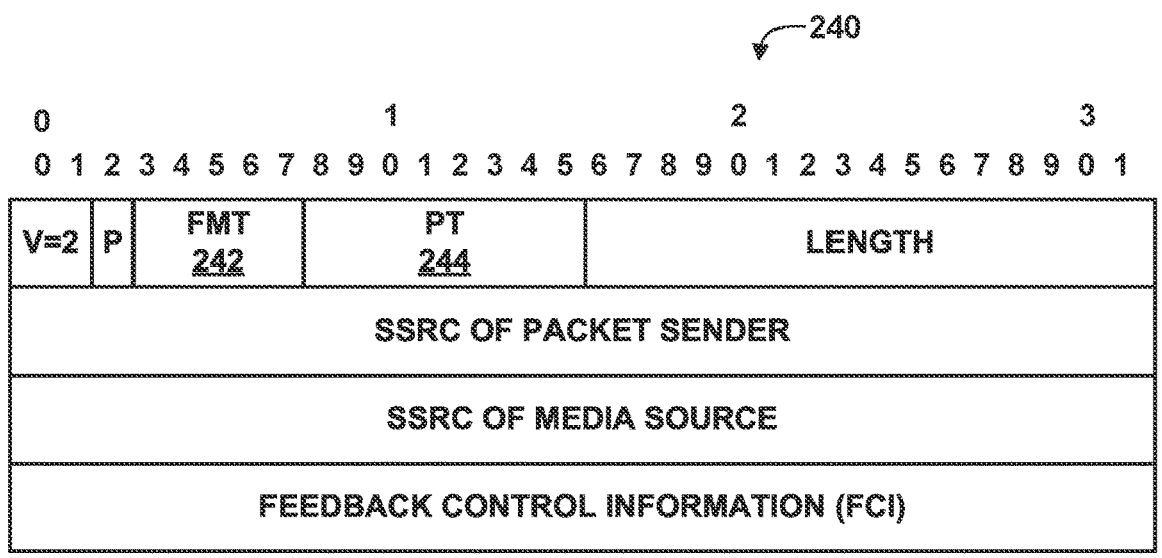
FIG. 8 is a conceptual diagram illustrating an example common packet format for feedback messages.

FIG. 8 is a conceptual diagram illustrating an example common packet format 240 for feedback messages. Application layer FB messages provide a mechanism to transparently convey feedback from the receiver (e.g., client device 40, FIG. 1) to the sender (e.g., server device 60, FIG. 1). The data to be exchanged between two application instances executed by such devices is usually defined in the application protocol specification.

In the example of FIG. 8, there is a five-bit FMT field 242, which indicates the relevant type of FB message. The example of FIG. 8 also depicts an eight-bit PT field 244, which indicates the RTCP packet type, such as Transport layer FB message (RTPFB) or payload-specific FB message (PSFB). Application layer FB messages are a specific case of payload-specific messages and may be identified by PT=PSFB and FMT=15. There may be exactly one application layer FB message contained in the FCI field unless the application layer FB message structure itself allows for stacking.

Figure 9:
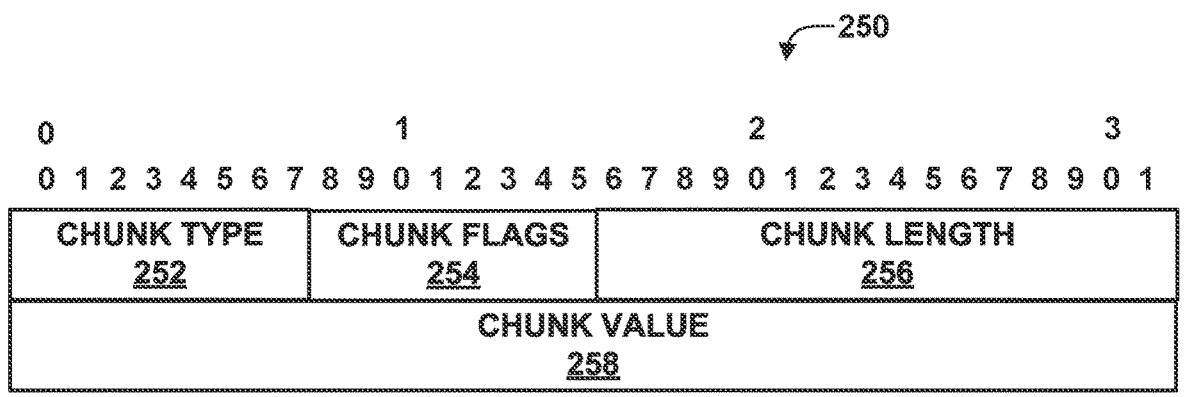
FIG. 9 is a conceptual diagram illustrating an example Stream Control Transmission Protocol (SCTP) chunk field format.

FIG. 9 is a conceptual diagram illustrating an example Stream Control Transmission Protocol (SCTP) chunk field format 250. WebRTC supports multiple simultaneous reliable and unreliable data channels. The reliable data channel may transfer critical real-time game control information or non-real-time text chat. SCTP provides the following features for transporting non-media data between browsers, per IETF RFC8831, "WebRTC Data Channels," January 2021: support of multiple unidirectional streams, ordered and unordered delivery of user messages, and reliable and partial reliable transport of user message.

Per SCTP, the sender cannot put more than one application message into an SCTP user message, and the maximum message size is 16 KB when message interleaving is not supported. SCTP ensures that messages are delivered to the SCTP user in sequence within a stream. While one stream may be blocked waiting for the next in-sequence user message, delivery from other streams may proceed. SCTP can also bypass the sequenced delivery service to allow specific user messages delivered to the user as soon as the user messages are received.

An SCTP packet includes a common header and one or more chunks. The common header includes a source port number, a destination port number, a verification tag, and checksum. Each chunk may contain either control information or user data. FIG. 9 depicts an example chunk field format 250. In this example, chunk field format 250 includes a chunk type field 252, chunk flags 254, chunk length field 256, and chunk value 258.

Figure 10:
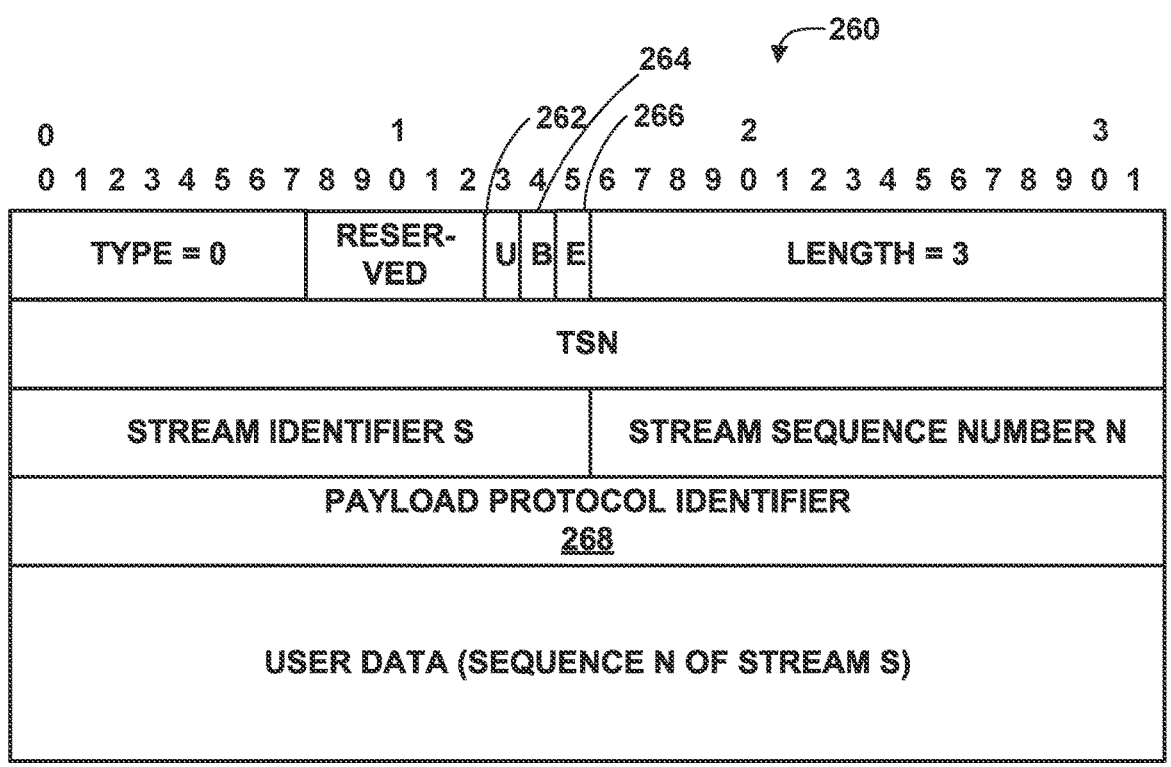
FIG. 10 is a conceptual diagram illustrating an example SCTP data chunk format.

FIG. 10 is a conceptual diagram illustrating an example SCTP data chunk format 260. When the chunk type is a payload data, chunk format 260 as shown in FIG. 10 may be used for the data chunk. U bit 262 indicates an unordered data chunk; B bit 264 and E bit 266 indicate a fragmented user message; payload protocol identifier 268 represents an application specific protocol identifier and is passed to SCTP by an upper layer and sent to its peer.

SCTP partial reliability extension (PR-SCTP) (per IETF RFC3758, "Stream Control Transmission Protocol (SCTP) Partial Reliability Extension," May 2004) provides ordered unreliable data transfer service and allows an SCTP endpoint to signal to its peer to move the cumulative acknowledgement (ack) point forward when some missing data should not be transmitted or re-transmitted by the sender (e.g., server device 60).

3GPP SA4 defines a number of media types for immersive RTC. These types may be categorized as follows:

Device information data specifies the device capabilities such as FOV, sensor information, camera information, and projection information.

Spatial and object description data describes the space or object information such as scene description, spatial description, and 3D visual model.

Interactive data represents the user interaction such as user pose with 4 quaternions for orientation and 3 vectors for position and 64-bit timestamp, viewport with 6 parameters carried via RTCP in IMS telephony (3GPP TS 26.114, "IP Multimedia Subsystem (IMS) Multimedia Telephony Media handling and interaction," June 2022); gesture, body action, facial expression and AR anchor point.

The device information data may be static. The device information may be exchanged at the beginning of the session or WebRTC interactive connectivity establishment (IETF RFC8445, "Interactive Connectivity Establishment (ICE)," July 2018), and the data may be carried in the session description protocol (SDP) (IETF RFC4566, "SDP: Session Description Protocol," July 2008). The device information update may also be carried in RTP or RTCP application layer FB messages.

Spatial and object description information may be exchanged occasionally by the event when the scene or the 3D model is updated or changed. The data size may be large and may not change frequently.

Interactive data is important in immersive RTC applications. Some interactive data, such as pose, viewport, or gesture, may trigger an event at the receiver side, and the sender may expect the response as soon as possible. Thus, a very-low-latency transportation is desirable. Some interactive data, such as facial expression or body action, may manipulate a 3D avatar model at the receiver side and synchronize with specific media data (e.g., mouth movements may need to be synchronized with audio data). Accordingly, a synchronization scheme may be required when transporting interactive data. Depending on the application, some media types may be delivered together; some media types may be delivered reliably while others may be delivered unreliably; some media types may require burst transport, while others may transport continuously or periodically. Table 1 below lists the characteristics of the media types. The transport protocol and payload format design to support these media types are desirable.

TABLE 1

Media Type Characteristics

| | Device information | Spatial & object information | Interaction data |
|---|---|---|---|
| Media type | FOV, sensor information, camera information, projection information | Scene description, spatial description, 3D visual mode, | AR anchor, user pose, viewport, gesture, body action, facial expression |
| Data size | Medium (<1 KB) | Large (>10 MB) | Small (<100B) |
| Frequency | Beginning of the session | periodic updates | >1 KHZ |
| timestamp | No | Yes | Yes |
| Latency | | | 50~1000 ms |
| Real-time Reliability | Non timed Reliable | Event based reliable | Periodic/continuous unreliable |
| Time Sync. | N | Y | Y |
| Sync. w/ media | N | N | Y |

Figure 11:
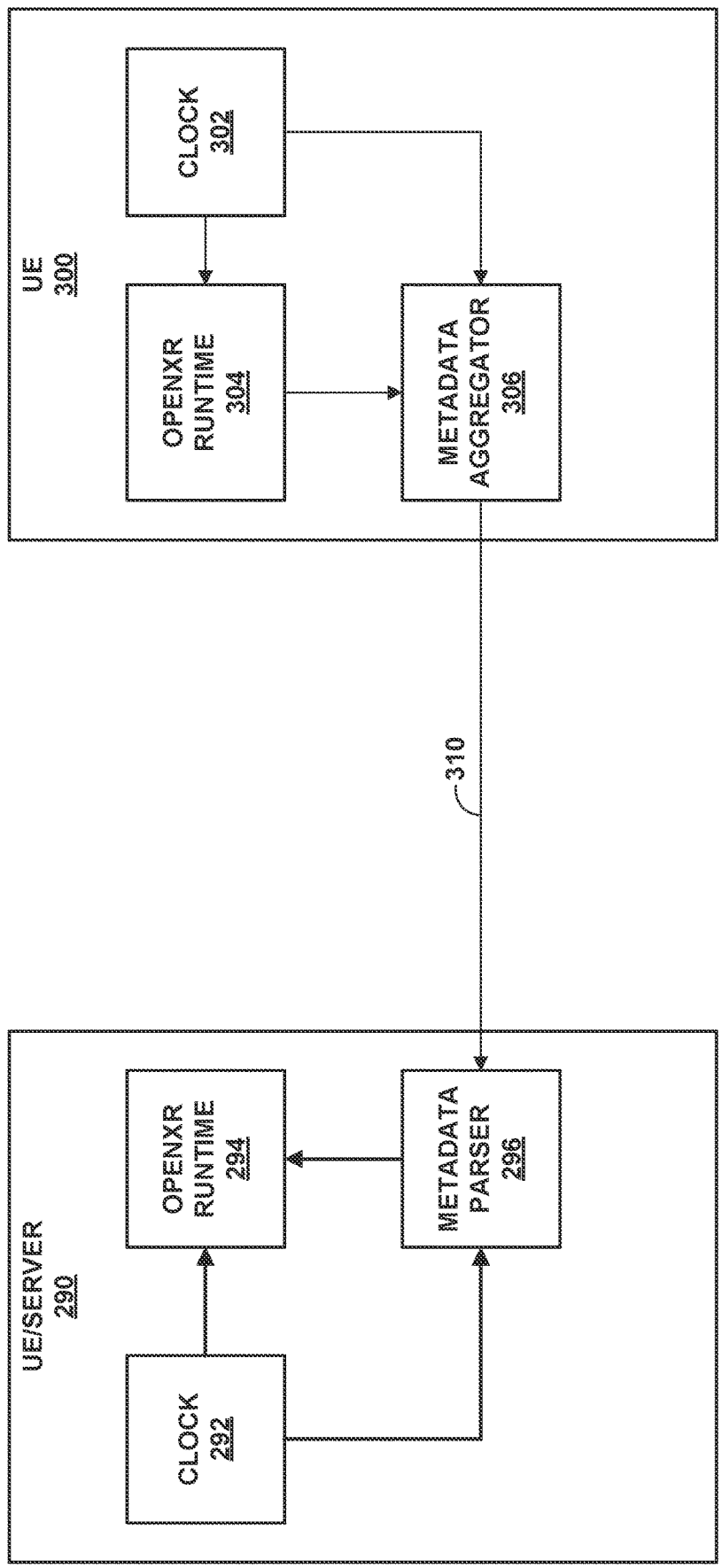
FIG. 11 is a conceptual diagram illustrating an example media transmission architecture that may perform techniques of this disclosure.

FIG. 11 is a conceptual diagram illustrating an example media transmission architecture that may perform techniques of this disclosure. The example of FIG. 11 depicts a high level architecture for metadata transmission. In this example, the architecture includes UE 300 and UE/server 290. That is, UE/server 290 may correspond to a UE or a server, such as an edge server. In this example, UE/server 290 includes clock 292, OpenXR runtime 294, and metadata parser 296, while UE 300 includes clock 302, OpenXR runtime 304, and metadata aggregator 306.

OpenXR runtime 304 of UE 300 may collect and/or derive metadata from sensor input with specific application programming interfaces (APIs), e.g., OpenXR APIs. Metadata aggregator 306 may extract essential metadata from OpenXR runtime 304 and transport the metadata with relevant timing information to remote UE/server 290 via connection 310, e.g., in the form of data included in a data channel or an RTP/RTCP header extension. UE/server 290 may then receive and parse, using metadata parser 296, the metadata carried in the input stream and pass the metadata and corresponding timing information to OpenXR runtime 294 for various operations, such as rendering.

Figure 12:
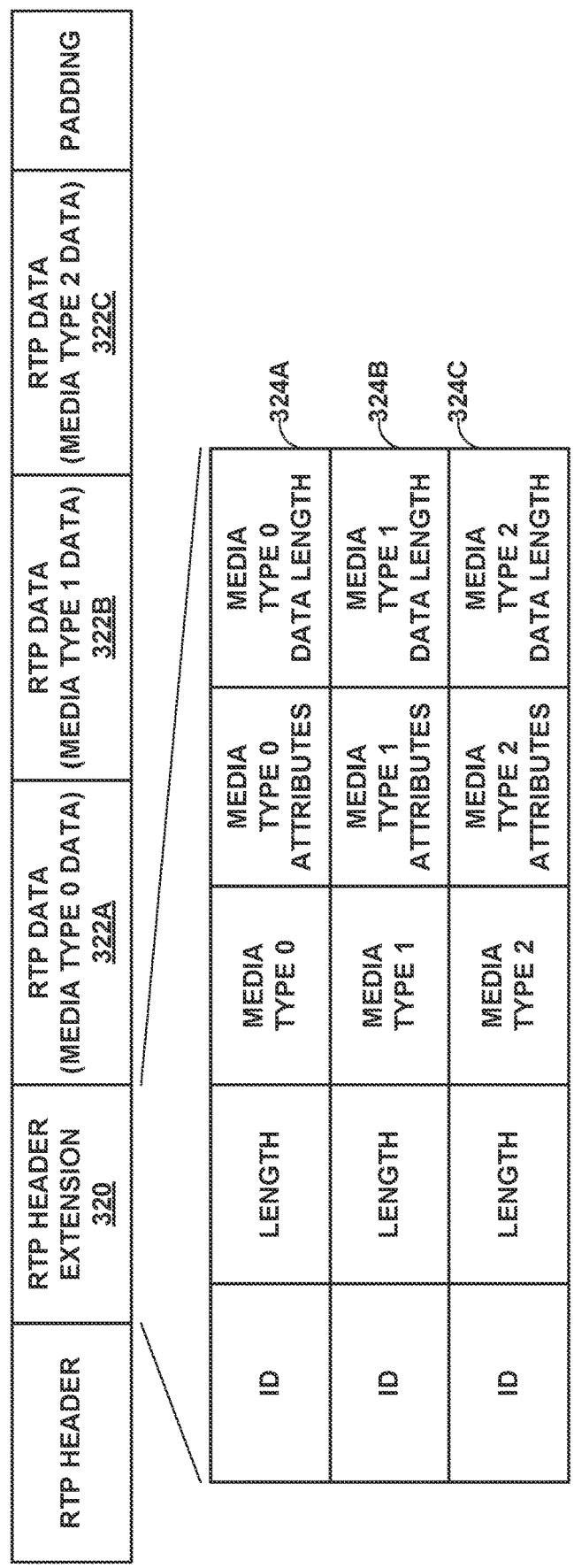
FIG. 12 is a conceptual diagram illustrating an example RTP extension and payload for media types according to the techniques of this disclosure.

FIG. 12 is a conceptual diagram illustrating an example RTP extension 320 and payload for media types according to the techniques of this disclosure. According to the techniques of this disclosure, server device 60 and client device 40 (FIG. 1) may exchange device information using an SDP framework for immersive RTC. As an example, an extension to RTP may be used to convey additional information, such as device information, to enhance immersive RTC. In this example, RTP header extension 320 may include a series of sets of header values 324A, 324B, 324C, including ID values, length values, media type values, media attribute values, and media length values for each of a series of sets of media data payloads 322A, 322B, 322C. SDP attributes, e.g., 3gpp_irtcw and/or 3gpp_ibacs, may be defined to indicate respectively an immersive WebRTC stream or IMS-based AR conversation stream. The values of these attributes may include camera information or display information such as FOV, projection, resolution, refresh rate, default pose and orientation, or the like.

The spatial and object information data may be transported over RTP, the payload format may use the fields of existing RTP header specified in RFC 3550. A mark bit (M) may indicate the last packet of the spatial and object information data in transmission order. The payload type may indicate the specific media type, such as scene description, spatial description, or 3D visual model. The assignment of an RTP payload type may be performed in a dynamic way and indicated in an SDP media description line.

In some examples, RTP header extension 320 may be used to indicate each media type and the data size when multiple media types are bundled in an RTP packet. Data fields of each extension element, following the ID and length fields, may include values specifying the media type and the media data size carried in the RTP payload. An additional indication or flag may be included in the header extension element data field to specify media type attributes.

One example attribute is a synchronization group. Media types belonging to the same synchronization group may be synchronized at the receiver side (e.g., client device 40). Another example attribute may indicate if a media type data should be synchronized with other media data such as audio, or video. Media types not requiring synchronization may be assigned to a default group (e.g., group 0).

In the example of FIG. 12, it is assumed that there are three data types (type 0, type 1, and type 2). In the example of FIG. 12, there are three sets of RTP header extensions (324A, 324B, 324C), one for each media type. The attributes may specify, for example, whether the corresponding media type is to be synchronized with another media type, and if so, which other media types.

Figure 13:
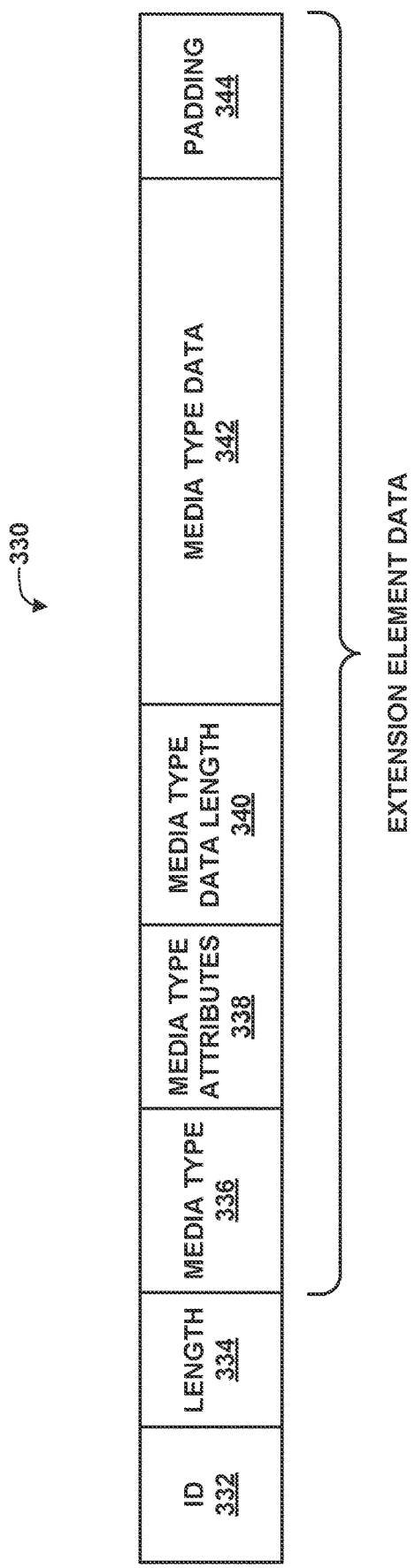
FIG. 13 is a conceptual diagram illustrating an example RTP extension element format for interactive media type data.

FIG. 13 is a conceptual diagram illustrating an example RTP extension element format 330 for interactive media type data. RTP extension element format 330 includes ID field 332, length field 334, media type field 336, media type attributes field 338, media type data length field 340, media type data 342, and padding data 344. In this example, an RTP extension may be used to carry a media data type. Each extension element may carry one media type data. Media type attributes field 338 may include data specifying attributes such as priority, synchronization indication, timestamp, and/or reliability information. The extension element may also specify a media type data length in bytes in media type data length field 340.

For some latency tolerant media types, such as a viewport, the interactive media type data may be transported via RTCP. An application layer FB message may be used to carry the media type data. The content of a feedback control information (FCI) entry of the RTCP packet may include the media type identifier, media type data structure, sequence number, timestamp, and media type attributes. When multiple media types are bundled together in a single RTCP packet, indicators to indicate a number of media types and the length of each media type data may be included in the FCI entry.

OpenXR specifies an action set, XrActionSet, which contains one or multiple actions (e.g., XrAction). An RTP/RTCP header extension may carry one XrActionSet, including the action set header followed by one or multiple action metadata payload.

An action set header may include: a 16-bit field indicating an action set metadata type; a 16-bit field indicating action set attributes; a 64-bit field indicate the action set name; a 32-bits field indicating the action set priority; a 32-bit field indicating the number of actions associated with the action set; and a 16-bit length field indicating the length of one action metadata payload.

An action metadata payload may include: a 16-bit field indicating an action type; a 16-bit field indicating the action attributes; and a 32-bit field indicating the action type as XrActionType specified in OpenXR. The action metadata field may carry the corresponding OpenXR extension data structure.

In some examples, an RTP header extension may carry one XR action due to a data length constraint of RTP. The extension element data may carry the action metadata payload as discussed above. An additional priority field may be defined to indicate the priority of the action set the action is associated with.

In some examples, OpenXR action set metadata may be converted to JavaScript Object Notation (JSON) format. JSON formatted metadata may be further compressed and may be carried in the RTP/RTCP header extension element data or the media type data.

Figure 14:
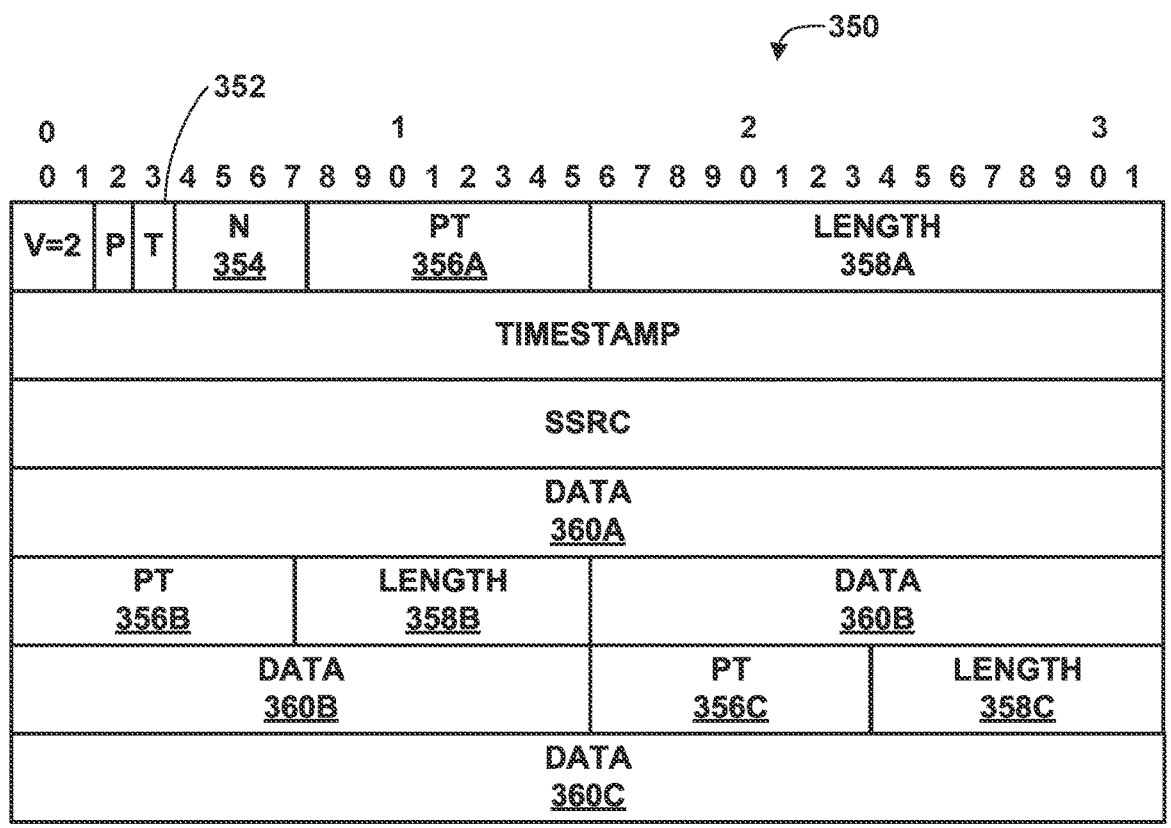
FIG. 14 is a conceptual diagram illustrating an example immersive media profile (IMP).

FIG. 14 is a conceptual diagram illustrating an example immersive media profile (IMP) 350. The IMP profile may be a profile of RTP. IMP may define immersive media specific interpretations of profile-dependent fields. In IMP, RTP header fields X, CC, and M may be merged into attribute fields. One attribute field may indicate if a timestamp is present or not. Another attribute field may indicate if more than one media type is included in the packet. The number of media types may be signaled if multiple media types are bundled in a common packet.

In the example of FIG. 14, three media types are contained in an RTP packet. In one example, the fields have following meaning:

T 352: one bit. If T bit is set, the timestamp must present in the header.

N 354: four bits. This field indicates the total number of media types present in the packet. A value of zero is not valid.

PT 356A, 356B, 356C: This field indicates the media type for corresponding media data 360A, 360B, 360C contained in this packet.

Length 358A, 358B, 358C: 16 bits. This field indicates the media type data length in 16-bits.

In some examples, additional media type attribute fields, such as synchronization, reliability, and priority, may be specified for each media type in the packet. A synchronization field may indicate whether the associated media type shares the same timestamp of the packet; a reliability field may indicate whether the associated media type data should be delivered and a packet loss may be reported to the sender to request re-transmission.

Figure 15:
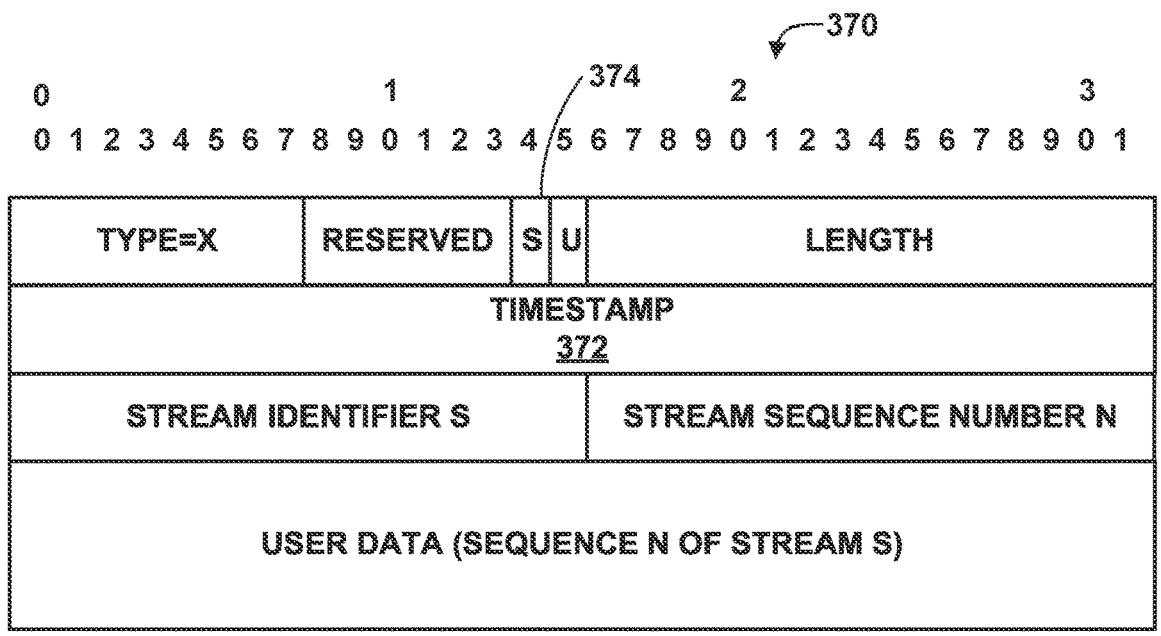
FIG. 15 is a conceptual diagram illustrating an example SCTP chunk format for an immersive media type.

FIG. 15 is a conceptual diagram illustrating an example SCTP chunk format 370 for an immersive media type. According to the techniques of this disclosure, immersive media type data may be carried using a WebRTC data channel over SCTP. Each interactive media type may be sent in a respective SCTP stream. Alternatively, multiple media types, such as synchronized media types, may be bundled into a single SCTP stream. The application executed by, e.g., client device 40 or server device 60, may set the data channel properties such as reliable or unreliable transmission, in-order or out-of-order delivery, and priority to transport specific media types.

Each media type data may be assigned to a data payload chunk in a SCTP packet. The payload protocol identifier may indicate the media type specified by upper application layer. The media type data may be stored in the payload user data.

Since SCTP does not provide a timestamp in the payload data chunk header, an attribute field may be added to indicate if the timestamp is present in the chunk. Timestamp 372 may be signalled in a fixed position of the chunk, for example, a 32-bit field following the payload protocol identifier, for the associated media type data.

In some examples, the payload protocol identifier field of SCTP payload data chunk type (Type=0) may indicate a dedicated application protocol and the chunk user data may carry the protocol data. The application protocol header may carry the attributes such as data boundary, media type, timestamp, sequence number, synchronization indication and data length, the application protocol payload data may carry the media type data structure.

In some examples, a new type of chunk may be defined for each interactive media type, and a chunk flag field may contain media type attributes, such as a synchronization attribute to indicate if the relevant timestamp is present in the chunk. An unordered attribute may indicate whether the data chunk is ordered or unordered.

In the example of FIG. 15, S bit 374 is a synchronization bit. If set to "1," this bit indicates that this is a synchronized data chunk and there is a timestamp assigned to this data chunk. Otherwise, the receiver may ignore the value of the timestamp field.

Figure 16:
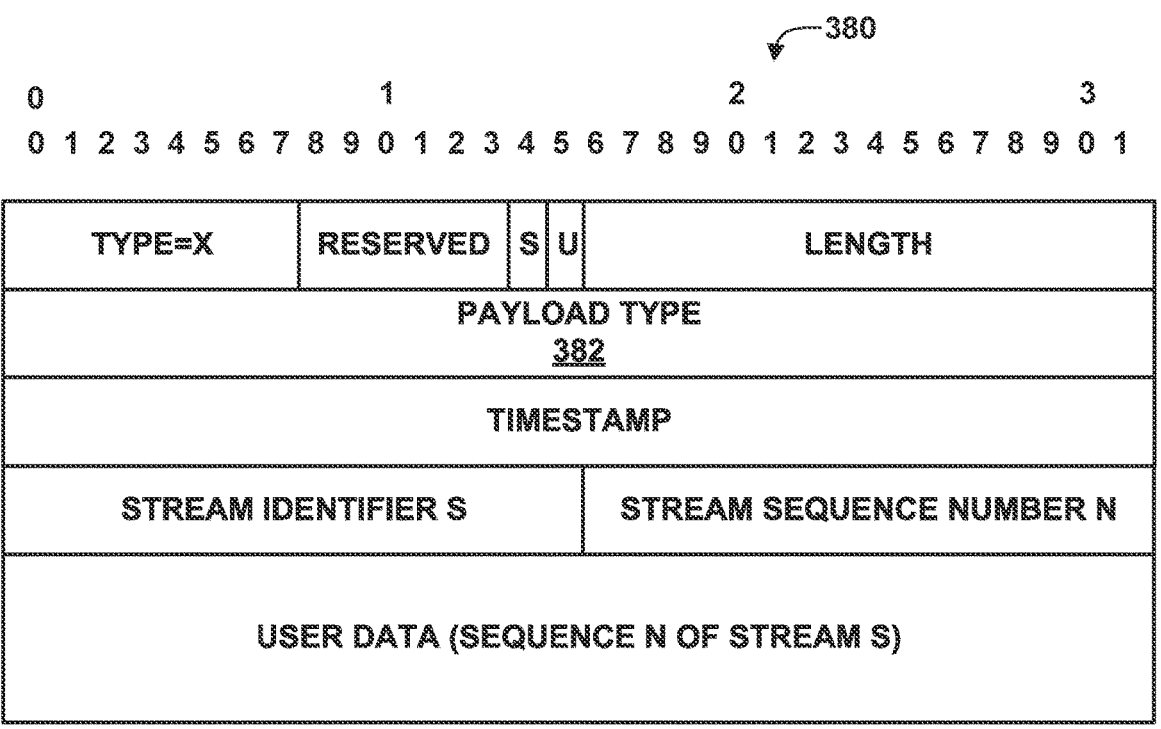
FIG. 16 is a conceptual diagram illustrating another example of an SCTP chunk format for immersive media type data.

FIG. 16 is a conceptual diagram illustrating another example of an SCTP chunk format 380 for immersive media type data. In this example, a specific type may be defined for all immersive media types. Payload type field 382 may be assigned in the immersive media type data chunk to indicate a specific media type.

Figure 17:
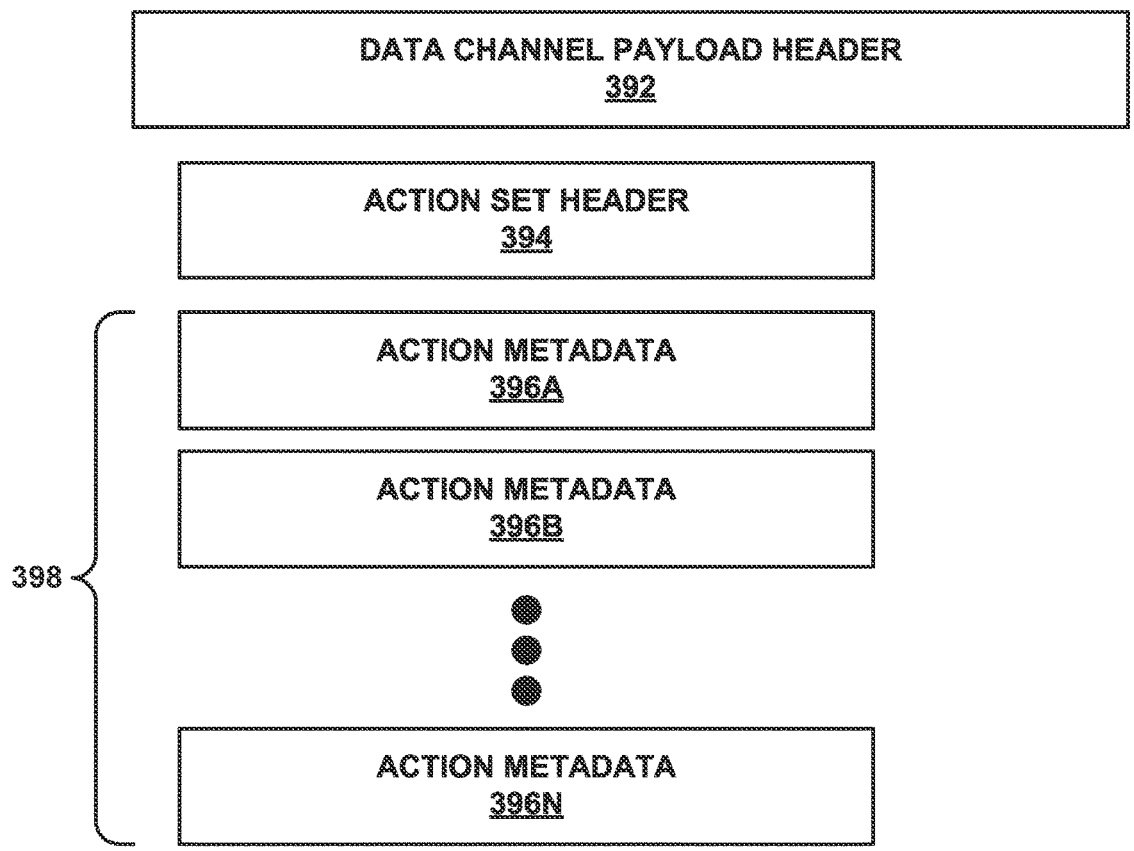
FIG. 17 is a conceptual diagram illustrating an example timed metadata payload format according to techniques of this disclosure.

FIG. 17 is a conceptual diagram illustrating an example timed metadata payload format 390 according to techniques of this disclosure. In this example, timed metadata payload format 390 includes data channel payload header 392, action set header 394, and an action set 398 including action metadata 396A-396N. In OpenXR, actions are created at initialization time and later used to request input device state, create action spaces, or control haptic events. An action set is a collection of actions. FIG. 17 depicts an example data chunk structure of the action set timed metadata.

In one example, the data chunk payload header is the first 16 bytes of the data chunk, a payload protocol identifier (PPID) is a value of "53" as "WebRTC Binary." User data may contain an action Set, XrActionSet, as defined in OpenXR. An action set may contain one or more actions, XrAction.

Figure 18:
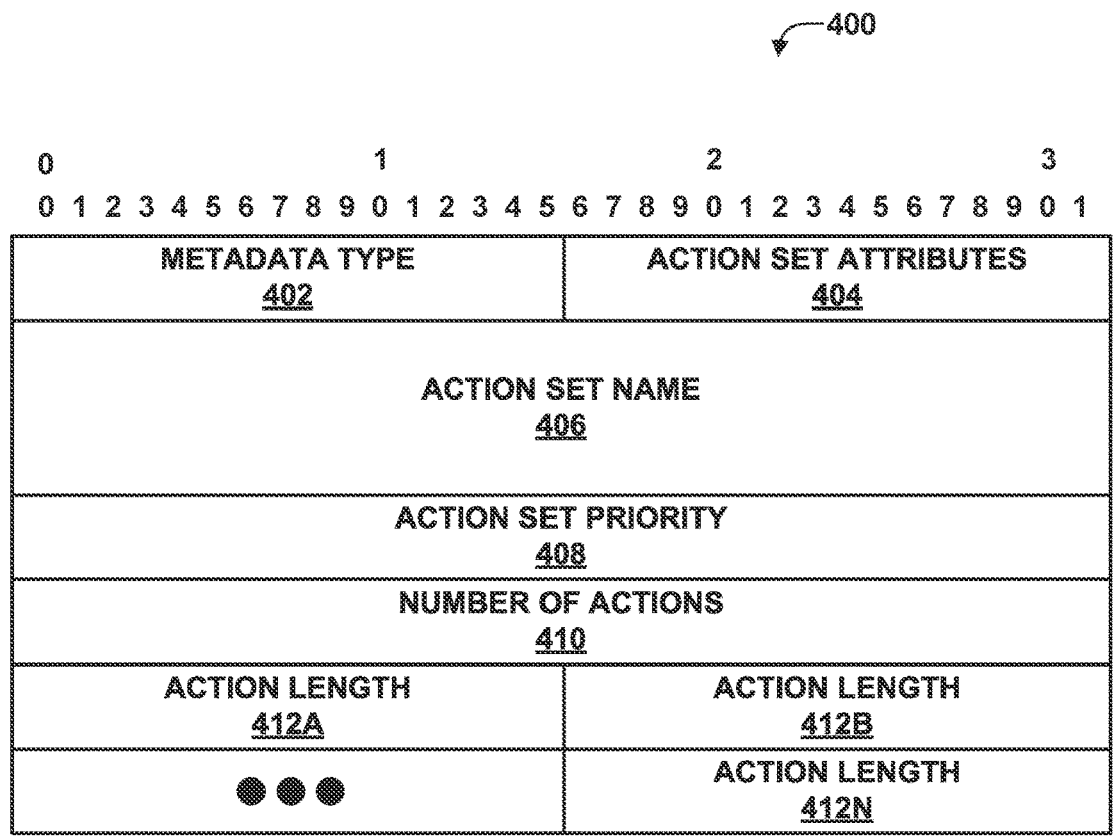
FIG. 18 is a block diagram illustrating an example action set header format according to techniques of this disclosure.

FIG. 18 is a block diagram illustrating an example action set header format 400 according to techniques of this disclosure. In this example, action set header format 400 includes metadata type value 402, action set attributes 404, action set name 406, action set priority 408, number of actions 410, and action lengths 412A-412N for each of the number of actions. Metadata type value 402 may indicate that a payload is for an action set. Action set attributes 404 may be a 16-bit field indicating action set attributes. Action set name 406 may be a 64-bit field indicating a name for the action set. Action set priority 408 may be a 32-bit field indicating a priority for the action set. Number of actions 410 may be a 32-bit field indicating a total number of actions included in the action set. Each of action lengths 412A-412N may be a respective 16-bit field indicating a length for a corresponding action of the actions included in the action set.

Figure 19:
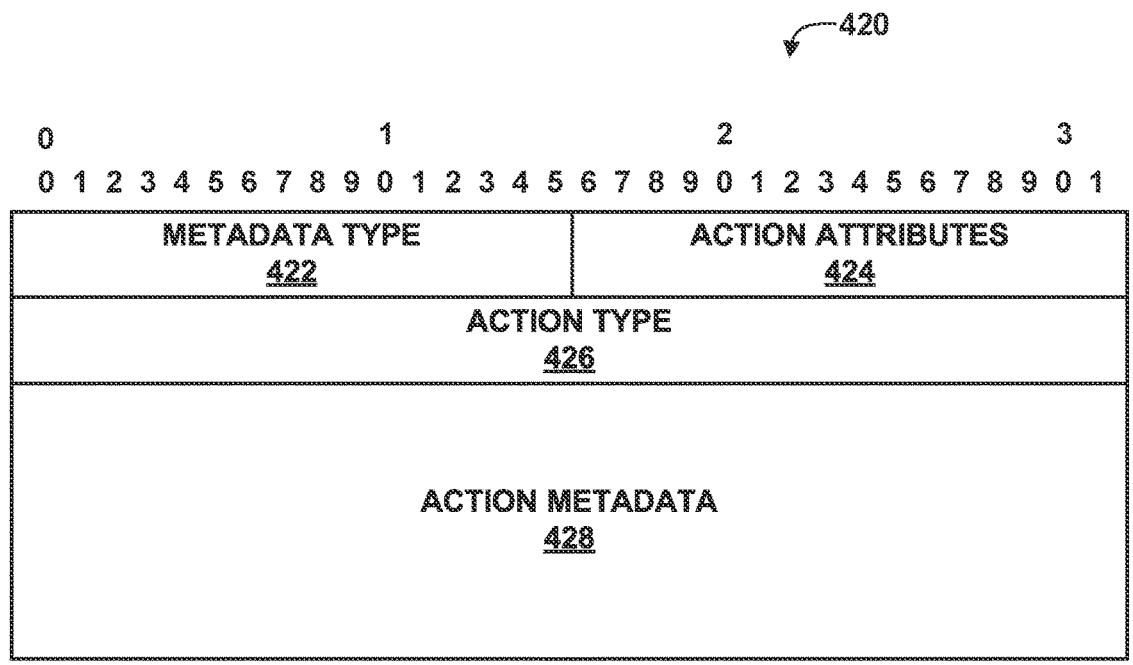
FIG. 19 is a block diagram illustrating an example action metadata payload format according to techniques of this disclosure.

FIG. 19 is a block diagram illustrating an example action metadata payload format 420 according to techniques of this disclosure. In this example, action metadata payload format 420 includes metadata type 422, action attributes 424, action type 426, and action metadata 428. Metadata type 422 may be a 16-bit field indicating a registered extension number of an action defined in OpenXR. Action attributes 424 may be a 16-bit field indicating attributes of the action. Action type 426 may be a 32-bit field indicating an XrActionType enumerated value as specified in OpenXR. Action metadata 428 may include timed metadata associated with the action.

In case the data length of an action set is large, each data chunk may carry one action metadata, and the payload format may be the same as the action metadata payload format. Additional priority field may be defined to indicate the priority of the action set the action is associated with. An additional action set ID field may be used to indicate the corresponding action set the action is associated with.

Figure 20:
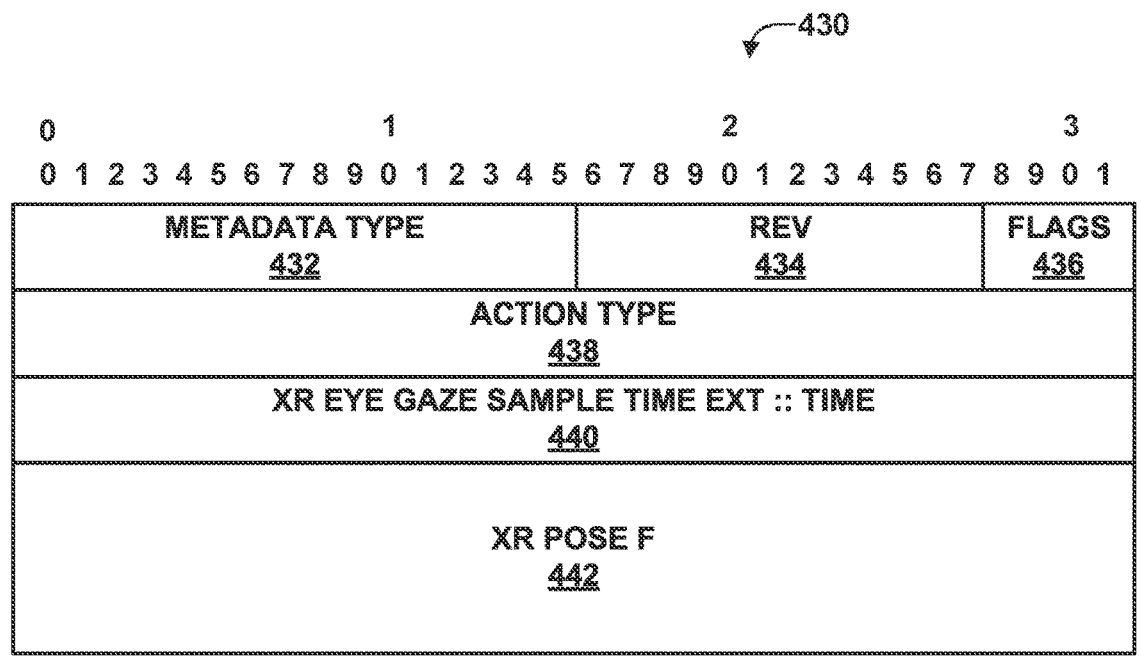
FIG. 20 is a block diagram illustrating an example gaze interaction metadata action payload format according to techniques of this disclosure.

FIG. 20 is a block diagram illustrating an example gaze interaction metadata action payload format 430 according to techniques of this disclosure. Gaze interaction metadata action payload format 430 may be used for an XR_EXT_eye_gaze_interaction of OpenXR. Gaze interaction metadata action payload format 430 of FIG. 20 includes metadata type 432, rev 434, flags 436, action type 438, XR eye gaze sample time ext::time 440, and XR pose f 442. Metadata type field 432 may have a value of 31. Flags 436 may be a 4-bit field mapped to XrSpaceLocationFlags as defined in OpenXR. Action type 438 may have a value of "XR_ACTION_TYPE_POSE_INPUT" per OpenXR.

XR pose f 442 may represent seven floating point elements, including XrQuaternionf (x, y, z, w) and XrVector3f (x, y, z). That is, each component of the XrQuaternion (x, y, z, and w) and of the XrVector3f (x, y, and z) may be expressed as a respective floating point value. The XrQuaternion may represent a three-dimensional rotation of a user in virtual space, while the XrVector3 value may represent a three-dimensional position of the user in the virtual space. Each element may be represented by a 32-bits single-precision floating-point number or 64-bits double-precision floating-point number as specified in IETF RFC4506.

In some examples, additional timing information, such as a predicted time, may be carried in addition to the OpenXR XrTime. For example, hand tracking predictions in 100 millisecond predicted time and 1 second predicted time may both be delivered to the server. The server may select an appropriate tracking prediction based on the varying end-to-end delay.

In some examples, the essential elements or fields of the OpenXR action set and actions may be converted to JSON format. A JSON formatted metadata payload may be further compressed and carried in the data chunk user data payload.

Figure 21:
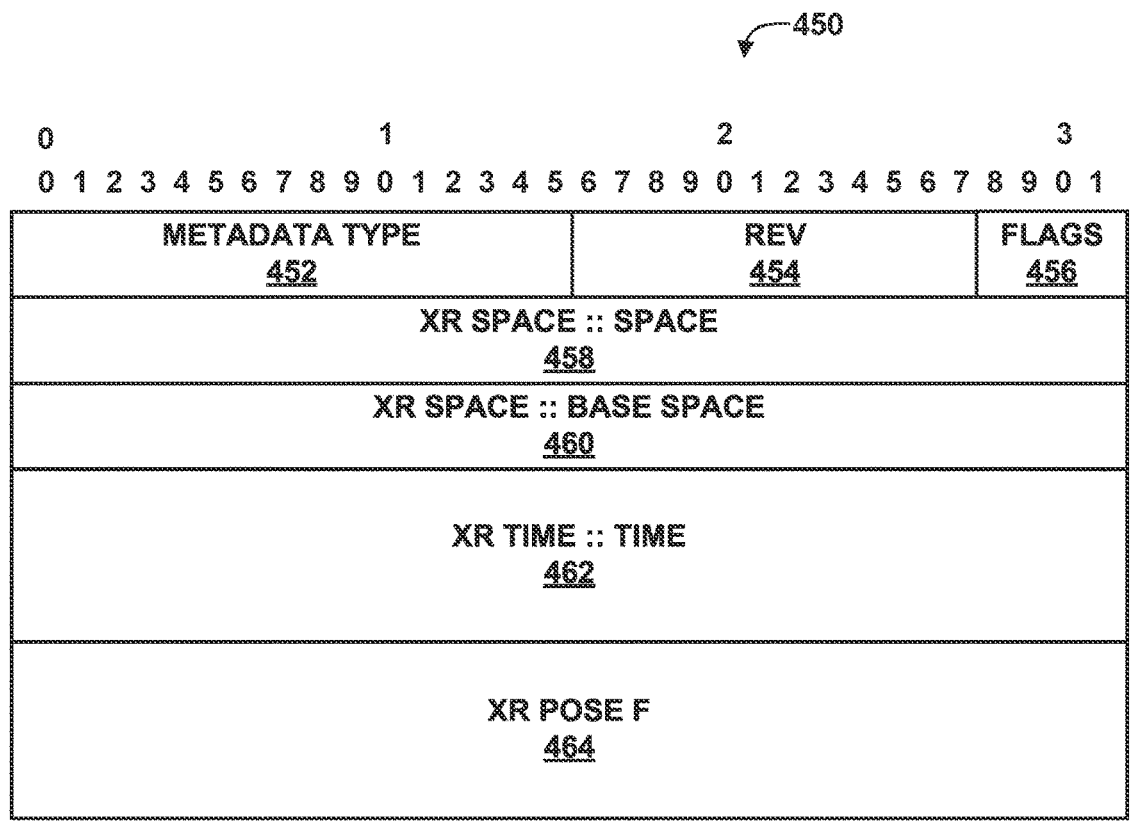
FIG. 21 is a block diagram illustrating an example space location metadata payload format according to techniques of this disclosure.

FIG. 21 is a block diagram illustrating an example space location metadata payload format 450 according to techniques of this disclosure. OpenXR applications use an xrLocateSpace function to find the pose of an XrSpace origin within a base XrSpace at a given historical or predicted time. The locating space elements include base space, space, time, and space location as defined in OpenXR.

The space location, XrSpaceLocation, includes XrSpaceLocationFlagBits, XrSpaceVelocity, and XrPosef. The space velocity includes velocity flags, linear velocity in units of meters per second, and angular velocity in units of radians per second. These values may be included in a data chunk structure as shown in FIG. 21.

Space location metadata payload format 450 of FIG. 21 includes metadata type 452, rev field 454, flags 456, XR space::space 458, XR space::base space 460, XR Time::time 462; and XR pose f 464. Metadata type 452 may include a value defined for XR space location. Flags 456 may be a 4-bit field indicating XR space location flags as defined in OpenXR. XR space::space 458 and XR space::base space 460 may be respective 32-bit fields that, together, indicate the space handle as defined in OpenXR. XR time::time 462 may be a sample timestamp expressed in nanoseconds.

XR pose f 464 may represent seven floating point elements, including XrQuaternionf (x, y, z, w) and XrVector3f (x, y, z). That is, each component of the XrQuaternion (x, y, z, and w) and of the XrVector3f (x, y, and z) may be expressed as a respective floating point value. The XrQuaternion may represent a three-dimensional rotation of a user in virtual space at the sample time, while the XrVector3 value may represent a three-dimensional position of the user in the virtual space at the sample time. Each element may be represented by a 32-bits single-precision floating-point number or 64-bits double-precision floating-point number as specified in IETF RFC4506.

Figure 22:
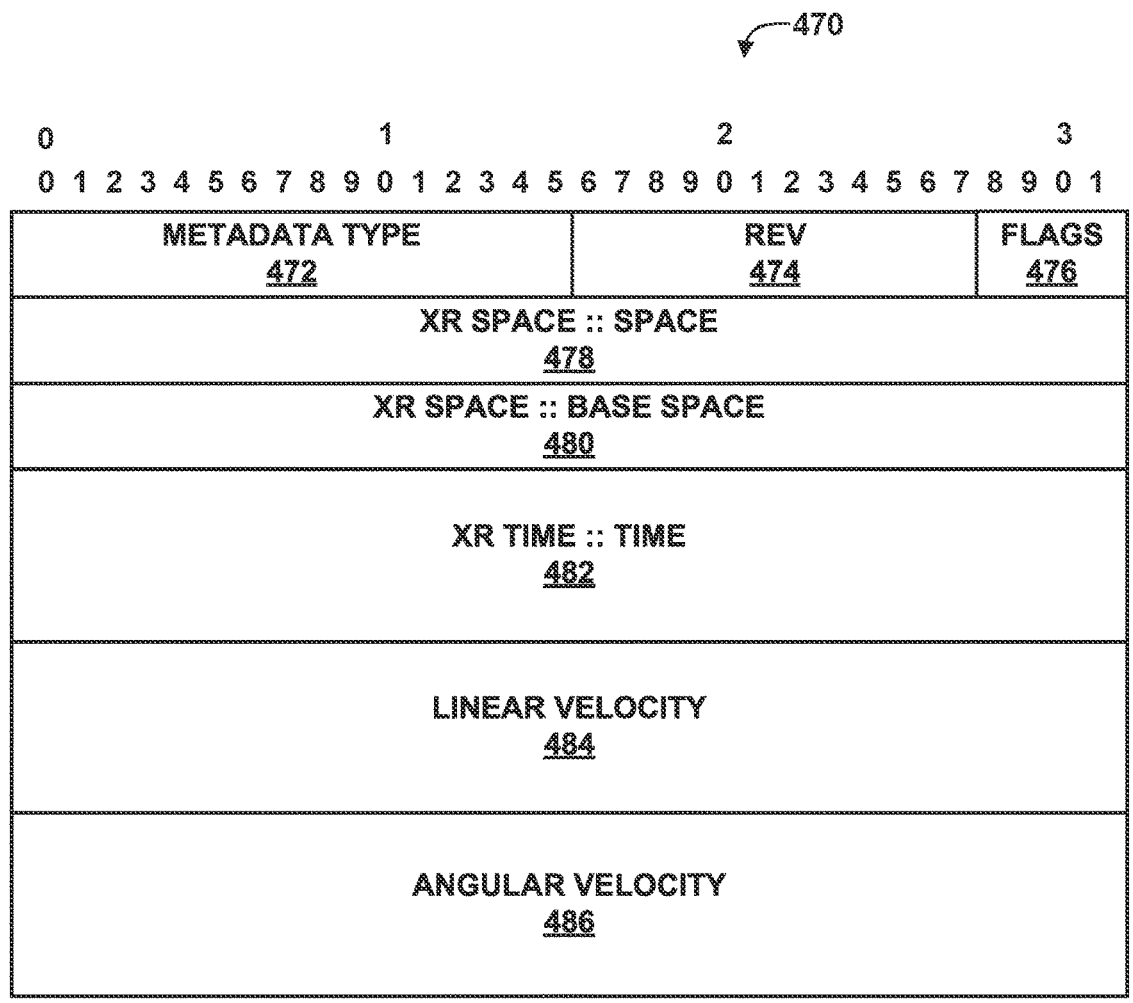
FIG. 22 is a block diagram illustrating an example space velocity metadata payload format according to techniques of this disclosure.

FIG. 22 is a block diagram illustrating an example space velocity metadata payload format 470 according to techniques of this disclosure. Space velocity metadata payload format 470 in the example of FIG. 22 includes metadata type 472, rev 474, flags 476, XR space::space 478, XR space::base space 480, XR time::time 482, linear velocity 484, and angular velocity 486. Metadata type 472 may have a value defined for XR space velocity. Flags 476 may be a 4-bit field indicating XR space velocity flags as defined in OpenXR. XR space::space 478 and XR space::base space 480 may be respective 32-bit fields that together indicate the space handle as defined in OpenXR.

Linear velocity 484 may have three floating point elements, including XrVector3f (x, y, z). Each element may be represented by a 32-bit single precision floating point number, or 64-bit double-precision floating point number, as specified in IETF RFC4506. The elements of the XrVector3 value may represent a component velocity in a particular direction, e.g., up/down, left/right, and forward/backward, such that together, the elements express a velocity in a particular three-dimensional vector direction at the sample time.

Angular velocity 486 may have three floating point elements, including XrVector3f (x, y, z). Each element may be represented by a 32-bit single precision floating point number, or 64-bit double-precision floating point number, as specified in IETF RFC4506. The elements of the XrVector3 value may represent component angular velocities in a particular Euler angle direction, such that together, the elements express a rotation around particular Euler angles at the sample time.

In some examples, additional timing information, such as predicted time, may be carried in addition to the OpenXR XrTime. For example, a space location prediction in 100 millisecond predicted time and 1 seconds predicted time may both be delivered to the server. The server may select an appropriate predicted location based on the varying end-to-end delay.

In some examples, the association between space velocity XrSpaceVelocity and space location XrSpaceLocation may be indicated in the payload.

In some examples, the essential elements or fields of the OpenXR space location or space velocity may be converted to JSON format. A JSON formatted payload may be further compressed, and may be carried in the data chunk user data payload.

Figure 23:
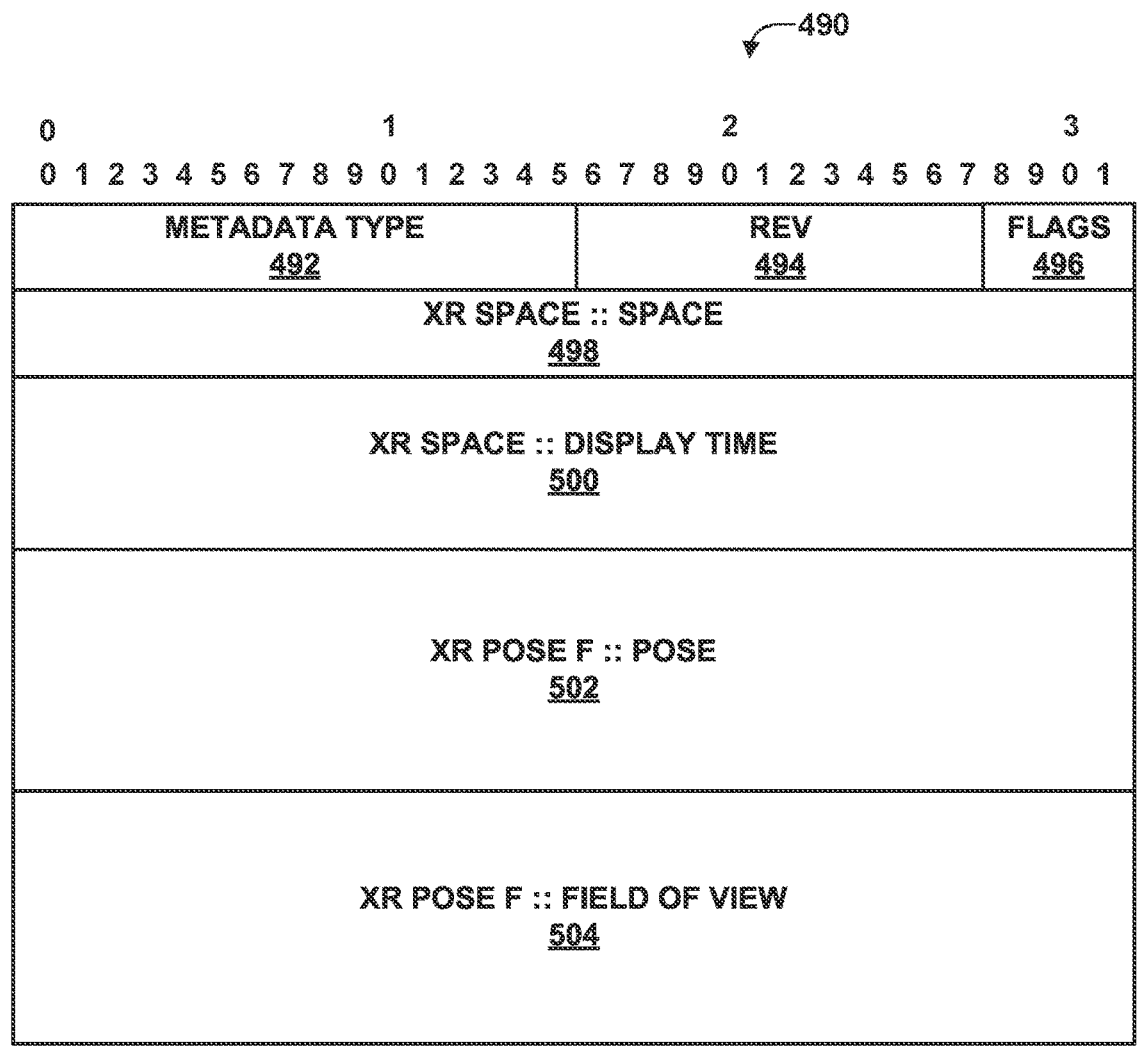
FIG. 23 is a block diagram illustrating an example view metadata payload format according to techniques of this disclosure.

FIG. 23 is a block diagram illustrating an example view metadata payload format 490 according to techniques of this disclosure. An OpenXR application may use xrLocateViews to retrieve the viewer pose and projection parameters needed to render each view for use in a composition projection layer. The xrLocateViews function returns the view and projection info for a particular display time. XrView includes pose and field of view (fov), e.g., for a user at a particular time.

View metadata payload format 490 of FIG. 23 includes metadata type 492, rev 494, flags 496, XR space::space 498, XR space::display time 500, XR pose f::pose 502, and XR pose f::field of view (fov) 504. Metadata type 492 may have a value defined for XrView. Flags 496 may be a 4-bit field indicating XrViewStateFlags as defined in OpenXR. XR space::space 498 may indicate the space handle as defined in OpenXR. XR time::display time 500 may be a display time in nanoseconds.

XR pose f::pose 502 may include seven floating point elements, including XrQuaternionf (x, y, z, w) and XrVector3f (x, y, z). That is, each component of the XrQuaternion (x, y, z, and w) and of the XrVector3f (x, y, and z) may be expressed as a respective floating point value. The XrQuaternion may represent a three-dimensional rotation of a user in virtual space, while the XrVector3 value may represent a three-dimensional position of the user in the virtual space at the display time. Each element may be represented by a 32-bits single-precision floating-point number or 64-bits double-precision floating-point number as specified in IETF RFC4506.

XR pose::fov 504 may include four floating point elements: XrFovf (angleLeft, angleRight, angleUp, angleDown). Each element may be represented by a 32-bits single-precision floating-point number or 64-bits double-precision floating-point number as specified in IETF RFC4506. The elements of XR pose::fov 504 may define a field of view for a user at the display time.

Multiple views may be bundled into a data chunk, or each view may be carried in a separate data chunk. When bundling multiple views, an XrLocateViews header may be added to indicate the number of views, the length of each view element, common space, and display time shared by view elements. In some examples, the essential elements or fields of the OpenXR view element may be converted to JSON format, and a JSON formatted metadata payload may be further compressed and carried in the data chunk user data payload.

Figure 24:
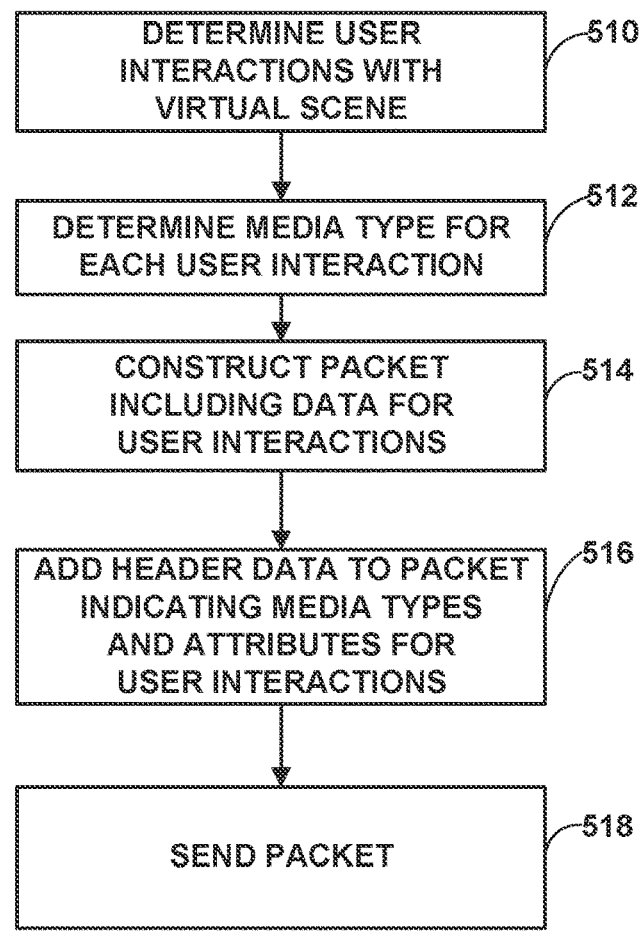
FIG. 24 is a flowchart illustrating an example method of sending user interaction data and associated metadata to another device involved in an XR multimedia communication session according to techniques of this disclosure.

FIG. 24 is a flowchart illustrating an example method of sending user interaction data and associated metadata to another device involved in an XR multimedia communication session according to techniques of this disclosure. The method of FIG. 24 is explained with respect to UE 300 of FIG. 11. It should be understood that other devices, such as client device 40 of FIG. 1, may perform this or a similar method.

Initially, UE 300 may present a representation of a virtual scene to a user of UE 300, e.g., via a heads-up display (HUD). UE 300 may also be communicatively coupled with various input devices, such as one or more controllers, gamepads, keyboard, mouse, or the like. The user may interact with the virtual scene in various ways, e.g., by physically moving, rotating, or otherwise changing a viewport (e.g., using controller input), touching virtual objects (e.g., as determined by collision detection between a representation of the user's avatar in the virtual scene and the object, a button press, or the like), speaking, or other such interactions. UE 300 may determine these user interactions with the virtual scene (510).

UE 300 may determine a media type for each of the user interactions (512). For example, media types may include animations associated with virtual objects being moved, audio data collected from the user, user pose, viewport, gesture, body action, facial expression, or the like. UE 300 may construct a packet including respective sets of data for each of the user interactions (514). Likewise, UE 300 may add header data to the packet indicating media types and attributes for the user interactions (516), e.g., as discussed above with respect to FIGS. 12-23. UE 300 may then send the packet to UE/server 290 (518), which represents another device involved in the XR multimedia communication session.

In this manner, the method of FIG. 24 represents an example of a method including determining one or more user interactions with a virtual scene, each of the one or more user interactions corresponding to a particular media type of one or more media types; constructing a packet including data for a media communication session, the packet including header data indicating the one or more media types for the one or more user interactions and one or more attributes for each of the one or more media types; and sending the packet to a device involved in the media communication session.

The following clauses represent various examples of the techniques of this disclosure:

Clause 1: A method of receiving media data, the method comprising: receiving a packet including media data of a media communication session, the packet including header data indicating one or more media types for the media data and one or more attributes for each of the one or more media types; extracting the media data of each of the one or more media types; processing the media data of each of the one or more media types according to the corresponding one or more attributes; and presenting the media data.

Clause 2: The method of clause 1, wherein the one or more attributes indicate one or more of camera information, display information, a field of view, projection, resolution, refresh rate, a default pose of a user, a default orientation of the user, a timestamp for the media data, priority data, a reliability indication, or whether two or more media types are to be presented synchronously.

Clause 3: The method of any of clauses 1 and 2, wherein the header data comprises an extension to a Real-time Transport Protocol (RTP) header, the RTP header comprising a mark bit (M-bit) having a value indicating whether the packet is a last packet of interactive media data in transmission order.

Clause 4: The method of any of clauses 1-3, wherein the header data comprises an extension to a Real-time Transport Protocol (RTP) header, the RTP header comprising a payload type value indicating whether the media data corresponds to a scene description, a spatial description, or a three-dimensional (3D) visual model.

Clause 5: The method of any of clauses 1-4, wherein the header data comprises an extension to a Real-time Transport Protocol (RTP) header, the RTP header comprising a payload type value indicating whether the media data represents a pose, a gesture, or a viewport.

Clause 6: The method of any of clauses 1-5, wherein the one or more media types comprises two or more media types, the two or more media types being one of audio data, video data, augmented reality (AR) data, extended reality (XR) data, mixed reality (MR) data, or virtual reality (VR) data.

Clause 7: The method of any of clauses 1-6, wherein the header data includes one or more length values for the one or more types of media data in the packet.

Clause 8: The method of any of clauses 1-7, wherein the header data conforms to a profile of Real-time Transport Protocol (RTP) in which an X-field, a CC field, and an M field are merged into one or more attribute fields.

Clause 9: The method of any of clauses 1-8, wherein the header data includes a value indicating whether a timestamp value will be included in the header data.

Clause 10: The method of any of clauses 1-9, wherein the header data includes a value indicating a total number of media types included in the packet.

Clause 11: The method of any of clauses 1-10, wherein the packet comprises a first packet, the media data conforms to a first type of media data, and the header data indicates a timestamp for the media data and that the first type of media data is to be synchronized with a second type of media data, the method further comprising: receiving a second packet including media data of the second type and second header data specifying the timestamp, wherein presenting the media data comprises presenting the media data of the first type of the first packet simultaneously with presenting the media data of the second type of the second packet in response to determining that the header data of the first packet and the second header data of the second packet each specify the timestamp.

Clause 12: The method of any of clauses 1-11, wherein receiving the packet comprises receiving the packet as part of a Real-time Transport Protocol (RTP) session.

Clause 13: The method of any of clauses 1-12, wherein receiving the packet comprises receiving the packet as part of a Web Real Time Communication (WebRTC) session.

Clause 14: The method of any of clauses 1-11, wherein receiving the packet comprises receiving the packet as part of a Stream Control Transmission Protocol (SCTP) stream.

Clause 15: The method of clause 14, wherein the SCTP stream includes media data for each of the one or more media types.

Clause 16: The method of clause 15, wherein each of the one or more media types of the SCTP stream is to be synchronized, the method further comprising receiving at least one additional SCTP stream including media data of an additional media type that is not be synchronized.

Clause 17: The method of any of clauses 14-16, wherein each of the one or more media types is assigned to a respective data payload chunk of the packet.

Clause 18: The method of clause 14, wherein the SCTP stream includes media data for one of the one or more media types, the method further comprising receiving one or more additional packets of one or more additional SCTP streams, each of the one or more additional SCTP streams including media data of a different one of the one or more media types.

Clause 19: The method of any of clauses 14-18, wherein a portion of a payload chunk of the packet indicates whether a timestamp is provided for media data of the payload chunk.

Clause 20: The method of any of clauses 14-19, wherein a portion of a payload chunk of the packet indicates whether synchronization information is provided for media data of the payload chunk.

Clause 21: A device for receiving media data, the device comprising one or more means for performing the method of any of clauses 1-20.

Clause 22: The device of clause 21, wherein the one or more means comprise one or more processors implemented in circuitry.

Clause 23: The device of any of clauses 21 and 22, wherein the one or more means comprise a memory configured to store the media data.

Clause 24: A device for receiving media data, the device comprising: means for receiving a packet including media data of a media communication session, the packet including header data indicating one or more media types for the media data and one or more attributes for each of the one or more media types; means for extracting the media data of each of the one or more media types; means for processing the media data of each of the one or more media types according to the corresponding one or more attributes; and means for presenting the media data.

Clause 25: A computer-readable storage medium having stored thereon instructions that, when executed, cause a processor to perform the method of any of clauses 1-20.

Clause 26: A method of sending media data, the method comprising: generating a packet including media data of a media communication session, the packet including header data indicating one or more media types for the media data and one or more attributes for each of the one or more media types; and sending the packet to a client device.

Clause 27: A method of processing media data, the method comprising: determining one or more user interactions with a virtual scene, each of the one or more user interactions corresponding to a particular media type of one or more media types; constructing a packet including data for a media communication session, the packet including header data indicating the one or more media types for the one or more user interactions and one or more attributes for each of the one or more media types; and sending the packet to a device involved in the media communication session.

Clause 28: The method of clause 27, wherein the one or more attributes indicate one or more of camera information, display information, a field of view, projection, resolution, refresh rate, a default pose of a user, a default orientation of the user, a timestamp for the media data, priority data, a reliability indication, or whether two or more media types are to be presented synchronously.

Clause 29: The method of clause 27, wherein the header data comprises an extension to a Real-time Transport Protocol (RTP) header, the RTP header comprising a mark bit (M-bit) having a value indicating whether the packet is a last packet of interactive media data in transmission order.

Clause 30: The method of clause 27, wherein the header data comprises an extension to a Real-time Transport Protocol (RTP) header, the RTP header comprising a payload type value indicating whether the media data corresponds to a scene description, a spatial description, or a three-dimensional (3D) visual model.

Clause 31: The method of clause 27, wherein the header data comprises an extension to a Real-time Transport Protocol (RTP) header, the RTP header comprising a payload type value indicating whether the media data represents a pose, a gesture, or a viewport.

Clause 32: The method of clause 27, wherein the one or more media types include an indication of an augmented reality (AR) anchor point, user pose data, viewport data, gesture data, body action data, or facial expression data.

Clause 33: The method of clause 27, wherein the header data includes one or more length values for the one or more types of media data in the packet.

Clause 34: The method of clause 27, wherein the header data conforms to a profile of Real-time Transport Protocol (RTP) in which an X-field, a CC field, and an M field are merged into one or more attribute fields.

Clause 35: The method of clause 27, wherein the header data includes a value indicating whether a timestamp value will be included in the header data.

Clause 36: The method of clause 27, wherein the header data includes a value indicating a total number of media types included in the packet.

Clause 37: The method of clause 27, wherein the packet comprises a first packet, the media data conforms to a first type of media data, and the header data indicates a timestamp for the media data and that the first type of media data is to be synchronized with a second type of media data, the method further comprising: constructing a second packet including media data of the second type and second header data specifying the timestamp; and sending the second packet to the device involved in the communication session.

Clause 38: The method of clause 27, wherein sending the packet comprises sending the packet as part of a Real-time Transport Protocol (RTP) session.

Clause 39: The method of clause 27, wherein sending the packet comprises sending the packet as part of a Web Real Time Communication (WebRTC) session.

Clause 40: The method of clause 27, wherein sending the packet comprises sending the packet as part of a Stream Control Transmission Protocol (SCTP) stream.

Clause 41: The method of clause 40, wherein the SCTP stream includes media data for each of the one or more media types.

Clause 42: The method of clause 41, wherein each of the one or more media types of the SCTP stream is to be synchronized, the method further comprising sending at least one additional SCTP stream including media data of an additional media type that is not to be synchronized.

Clause 43: The method of clause 40, wherein each of the one or more media types is assigned to a respective data payload chunk of the packet.

Clause 44: The method of clause 40, wherein the SCTP stream includes media data for one of the one or more media types, the method further comprising sending one or more additional packets of one or more additional SCTP streams, each of the one or more additional SCTP streams including media data of a different one of the one or more media types.

Clause 45: The method of clause 40, wherein a portion of a payload chunk of the packet indicates whether a timestamp is provided for media data of the payload chunk.

Clause 46: The method of clause 40, wherein a portion of a payload chunk of the packet indicates whether synchronization information is provided for media data of the payload chunk.

Clause 47: A device for processing media data, the device comprising: a memory configured to store media data; and a processing system comprising one or more processors implemented in circuitry, the processing system being configured to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

Clause 48: The device of clause 47, wherein the one or more attributes indicate one or more of camera information, display information, a field of view, projection, resolution, refresh rate, a default pose of a user, a default orientation of the user, a timestamp for the media data, priority data, a reliability indication, or whether two or more media types are to be presented synchronously.

Clause 49: The device of clause 47, wherein the header data comprises an extension to a Real-time Transport Protocol (RTP) header, the RTP header comprising a mark bit (M-bit) having a value indicating whether the packet is a last packet of interactive media data in transmission order.

Clause 50: The device of clause 47, wherein the header data comprises an extension to a Real-time Transport Protocol (RTP) header, the RTP header comprising a payload type value indicating whether the media data corresponds to a scene description, a spatial description, or a three-dimensional (3D) visual model.

Clause 51: The device of clause 47, wherein the header data comprises an extension to a Real-time Transport Protocol (RTP) header, the RTP header comprising a payload type value indicating whether the media data represents a pose, a gesture, or a viewport.

Clause 52: The device of clause 47, wherein the one or more media types include an indication of an augmented reality (AR) anchor point, user pose data, viewport data, gesture data, body action data, or facial expression data.

Clause 53: The device of clause 47, wherein the header data includes one or more length values for the one or more types of media data in the packet.

Clause 54: The device of clause 47, wherein the header data conforms to a profile of Real-time Transport Protocol (RTP) in which an X-field, a CC field, and an M field are merged into one or more attribute fields.

Clause 55: A device for processing media data, the device comprising: means for determining one or more user interactions with a virtual scene, each of the one or more user interactions corresponding to a particular media type of one or more media types; means for constructing a packet including data for a media communication session, the packet including header data indicating the one or more media types for the one or more user interactions and one or more attributes for each of the one or more media types; and means for sending the packet to a device involved in the media communication session.

Clause 56: A computer-readable storage medium having stored thereon instructions that, when executed, cause a processor to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

Clause 57: A method of processing media data, the method comprising: determining one or more user interactions with a virtual scene, each of the one or more user interactions corresponding to a particular media type of one or more media types; constructing a packet including data for a media communication session, the packet including header data indicating the one or more media types for the one or more user interactions and one or more attributes for each of the one or more media types; and sending the packet to a device involved in the media communication session.

Clause 58: The method of clause 57, wherein the one or more attributes indicate one or more of camera information, display information, a field of view, projection, resolution, refresh rate, a default pose of a user, a default orientation of the user, a timestamp for the media data, priority data, a reliability indication, or whether two or more media types are to be presented synchronously.

Clause 59: The method of any of clauses 57 and 58, wherein the header data comprises an extension to a Real-time Transport Protocol (RTP) header, the RTP header comprising a mark bit (M-bit) having a value indicating whether the packet is a last packet of interactive media data in transmission order.

Clause 60: The method of any of clauses 57-59, wherein the header data comprises an extension to a Real-time Transport Protocol (RTP) header, the RTP header comprising a payload type value indicating whether the media data corresponds to a scene description, a spatial description, or a three-dimensional (3D) visual model.

Clause 61: The method of any of clauses 57-60, wherein the header data comprises an extension to a Real-time Transport Protocol (RTP) header, the RTP header comprising a payload type value indicating whether the media data represents a pose, a gesture, or a viewport.

Clause 62: The method of any of clauses 57-61, wherein the one or more media types include an indication of an augmented reality (AR) anchor point, user pose data, viewport data, gesture data, body action data, or facial expression data.

Clause 63: The method of any of clauses 57-62, wherein the header data includes one or more length values for the one or more types of media data in the packet.

Clause 64: The method of any of clauses 57-63, wherein the header data conforms to a profile of Real-time Transport Protocol (RTP) in which an X-field, a CC field, and an M field are merged into one or more attribute fields.

Clause 65: The method of any of clauses 57-64, wherein the header data includes a value indicating whether a timestamp value will be included in the header data.

Clause 66: The method of any of clauses 57-65, wherein the header data includes a value indicating a total number of media types included in the packet.

Clause 67: The method of any of clauses 57-66, wherein the packet comprises a first packet, the media data conforms to a first type of media data, and the header data indicates a timestamp for the media data and that the first type of media data is to be synchronized with a second type of media data, the method further comprising: constructing a second packet including media data of the second type and second header data specifying the timestamp; and sending the second packet to the device involved in the communication session.

Clause 68: The method of any of clauses 57-67, wherein sending the packet comprises sending the packet as part of a Real-time Transport Protocol (RTP) session.

Clause 69: The method of any of clauses 57-68, wherein sending the packet comprises sending the packet as part of a Web Real Time Communication (WebRTC) session.

Clause 70: The method of any of clauses 57-69, wherein sending the packet comprises sending the packet as part of a Stream Control Transmission Protocol (SCTP) stream.

Clause 71: The method of clause 70, wherein the SCTP stream includes media data for each of the one or more media types.

Clause 72: The method of clause 71, wherein each of the one or more media types of the SCTP stream is to be synchronized, the method further comprising sending at least one additional SCTP stream including media data of an additional media type that is not to be synchronized.

Clause 73: The method of any of clauses 71 and 72, wherein each of the one or more media types is assigned to a respective data payload chunk of the packet.

Clause 74: The method of clauses 71-73, wherein the SCTP stream includes media data for one of the one or more media types, the method further comprising sending one or more additional packets of one or more additional SCTP streams, each of the one or more additional SCTP streams including media data of a different one of the one or more media types.

Clause 75: The method of clauses 71-74, wherein a portion of a payload chunk of the packet indicates whether a timestamp is provided for media data of the payload chunk.

Clause 76: The method of clauses 71-75, wherein a portion of a payload chunk of the packet indicates whether synchronization information is provided for media data of the payload chunk.

Clause 77: A device for processing media data, the device comprising: a memory configured to store media data; and a processing system comprising one or more processors implemented in circuitry, the processing system being configured to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

Clause 78: The device of clause 77, wherein the one or more attributes indicate one or more of camera information, display information, a field of view, projection, resolution, refresh rate, a default pose of a user, a default orientation of the user, a timestamp for the media data, priority data, a reliability indication, or whether two or more media types are to be presented synchronously.

Clause 79: The device of any of clauses 77 and 78, wherein the header data comprises an extension to a Real-time Transport Protocol (RTP) header, the RTP header comprising a mark bit (M-bit) having a value indicating whether the packet is a last packet of interactive media data in transmission order.

Clause 80: The device of any of clauses 77-79, wherein the header data comprises an extension to a Real-time Transport Protocol (RTP) header, the RTP header comprising a payload type value indicating whether the media data corresponds to a scene description, a spatial description, or a three-dimensional (3D) visual model.

Clause 81: The device of any of clauses 77-80, wherein the header data comprises an extension to a Real-time Transport Protocol (RTP) header, the RTP header comprising a payload type value indicating whether the media data represents a pose, a gesture, or a viewport.

Clause 82: The device of any of clauses 77-81, wherein the one or more media types include an indication of an augmented reality (AR) anchor point, user pose data, viewport data, gesture data, body action data, or facial expression data.

Clause 83: The device of any of clauses 77-82, wherein the header data includes one or more length values for the one or more types of media data in the packet.

Clause 84: The device of any of clauses 77-83, wherein the header data conforms to a profile of Real-time Transport Protocol (RTP) in which an X-field, a CC field, and an M field are merged into one or more attribute fields.

Clause 85: A device for processing media data, the device comprising: means for determining one or more user interactions with a virtual scene, each of the one or more user interactions corresponding to a particular media type of one or more media types; means for constructing a packet including data for a media communication session, the packet including header data indicating the one or more media types for the one or more user interactions and one or more attributes for each of the one or more media types; and means for sending the packet to a device involved in the media communication session.

Clause 86: A computer-readable storage medium having stored thereon instructions that, when executed, cause a processor to: determine one or more user interactions with a virtual scene, each of the one or more user interactions corresponding to a particular media type of one or more media types; construct a packet including data for a media communication session, the packet including header data indicating the one or more media types for the one or more user interactions and one or more attributes for each of the one or more media types; and send the packet to a device involved in the media communication session.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:
   initializing, by a client device used by a user, an augmented reality (AR) media communication session performed using WebRTC, wherein initializing the AR media communication session includes receiving data representing an action set for the AR media communication session, the action set including a collection of one or more actions that can be performed during the AR media communication session to request an input device state, create action spaces, or control haptic events;
   determining, by the client device, one or more user interactions of the user with a virtual scene, the one or more user interactions including head movements defining a pose of the user and interactions with an input device;
   receiving, by the client device, data to perform at least one of the one or more actions to request the input device state, create action spaces, or control haptic events;
   constructing, by the client device, one or more packets including data for the AR media communication session, the data including pose information for a pose of a participant in the AR media communication session corresponding to the one or more user interactions, and when the data to perform the at least one of the one or more actions includes data to request the input device state, constructing the one or more packets comprises constructing the one or more packets to indicate the input device state based on the interactions with the input device; and
   sending, by the client device, the one or more packets to a device involved in the media communication session.

2. The method of claim 1, wherein at least one packet of the one or more packets includes header data indicating one or more media types for the one or more user interactions and one or more attributes for each of the one or more media types, the one or more attributes having values representing the one or more user interactions.

3. The method of claim 2, wherein the one or more attributes indicate one or more of camera information, display information, a field of view, projection, resolution, refresh rate, a default pose of the user, a default orientation of the user, a timestamp, priority data, a reliability indication, or whether two or more media types are to be presented synchronously.

4. The method of claim 2, wherein the header data comprises an extension to a Real-time Transport Protocol (RTP) header, the RTP header comprising a mark bit (M-bit) having a value indicating whether the at least one packet including the header data is a last packet of interactive media data in transmission order.

5. The method of claim 2, wherein the header data comprises an extension to a Real-time Transport Protocol (RTP) header, the RTP header comprising a payload type value indicating whether the media data corresponds to a scene description, a spatial description, or a three-dimensional (3D) visual model.

6. The method of claim 2, wherein the header data comprises an extension to a Real-time Transport Protocol (RTP) header, the RTP header comprising a payload type value indicating whether the media data represents a pose, a gesture, or a viewport.

7. The method of claim 2, wherein the one or more media types include an indication of an augmented reality (AR) anchor point, user pose data, viewport data, gesture data, body action data, or facial expression data.

8. The method of claim 2, wherein the header data includes one or more length values for the one or more media types in the at least one packet including the header data.

9. The method of claim 2, wherein the header data conforms to a profile of Real-time Transport Protocol (RTP) in which an X-field, a CC field, and an M field are merged into one or more attribute fields.

10. The method of claim 2, wherein the header data includes a value indicating whether a timestamp value will be included in the header data.

11. The method of claim 2, wherein the header data includes a value indicating a total number of media types included in the at least one packet including the header data.

12. The method of claim 2, wherein the at least one packet comprises a first packet, the media data conforms to a first type of media data, and the header data indicates a timestamp for the media data and that the first type of media data is to be synchronized with a second type of media data, the method further comprising:

constructing a second packet including media data of the second type and second header data specifying the timestamp; and sending the second packet to the device involved in the media communication session.

13. The method of claim 2, wherein sending the one or more packets comprises sending the one or more packets as part of a Stream Control Transmission Protocol (SCTP) stream.

14. The method of claim 13, wherein the SCTP stream includes media data for each of the one or more media types.

15. The method of claim 14, wherein each of the one or more media types of the SCTP stream is to be synchronized, the method further comprising sending at least one additional SCTP stream including media data of an additional media type that is not to be synchronized.

16. The method of claim 13, wherein each of the one or more media types is assigned to a respective data payload chunk of the one or more packets.

17. The method of claim 13, wherein the SCTP stream includes media data for one of the one or more media types, the method further comprising sending one or more additional packets of one or more additional SCTP streams, each of the one or more additional SCTP streams including media data of a different one of the one or more media types.

18. The method of claim 13, wherein a portion of a payload chunk of the one or more packets indicates whether a timestamp is provided for media data of the payload chunk.

19. The method of claim 13, wherein a portion of a payload chunk of the one or more packets indicates whether synchronization information is provided for media data of the payload chunk.

20. The method of claim 1, wherein sending the one or more packets comprises sending the one or more packets as part of a Real-time Transport Protocol (RTP) session.

21. A client device for processing media data, the client device comprising:

a memory configured to store the media data; and a processing system comprising one or more processors implemented in circuitry, the processing system being configured to:

initialize an augmented reality (AR) media communication session performed using WebRTC, including to receive data representing an action set for the AR media communication session, the action set including a collection of one or more actions that can be performed during the AR media communication session to request an input device state, create action spaces, or control haptic events;

determine one or more user interactions of a user with a virtual scene, the one or more user interactions including head movements defining a pose of the user and interactions with an input device;

receive data to perform at least one of the one or more actions to request the input device state, create action spaces, or control haptic events;

construct one or more packets including data for the AR media communication session, the data including pose information for a pose of a participant in the AR media communication session corresponding to the one or more user interactions, and when the data to perform the at least one of the one or more actions includes data to request the input device state, the processing system is configured to construct the one or more packets to include data indicative of the input device state based on the interactions with the input device; and send the one or more packets to a device involved in the media communication session.

22. The client device of claim 21, wherein at least one packet of the one or more packets includes header data indicating one or more media types for the one or more user interactions and one or more attributes for each of the one or more media types, the one or more attributes having values representing the one or more user interactions.

23. The client device of claim 22, wherein the one or more attributes indicate one or more of camera information, display information, a field of view, projection, resolution, refresh rate, a default pose of the user, a default orientation of the user, a timestamp for the media data, priority data, a reliability indication, or whether two or more media types are to be presented synchronously.

24. The client device of claim 22, wherein the header data comprises an extension to a Real-time Transport Protocol (RTP) header, the RTP header comprising a mark bit (M-bit) having a value indicating whether the at least one packet including the header data is a last packet of interactive media data in transmission order.

25. The client device of claim 22, wherein the header data comprises an extension to a Real-time Transport Protocol (RTP) header, the RTP header comprising a payload type value indicating whether the media data corresponds to a scene description, a spatial description, or a three-dimensional (3D) visual model.

26. The client device of claim 22, wherein the header data comprises an extension to a Real-time Transport Protocol (RTP) header, the RTP header comprising a payload type value indicating whether the media data represents a pose, a gesture, or a viewport.

27. The client device of claim 22, wherein the one or more media types include an indication of an augmented reality (AR) anchor point, user pose data, viewport data, gesture data, body action data, or facial expression data.

28. The client device of claim 22, wherein the header data includes one or more length values for the one or more media types in the at least one packet including the header data.

29. A client device for processing media data, the client device comprising:

means for initializing an augmented reality (AR) media communication session performed using WebRTC, wherein the means for initializing the AR media communication session includes means for receiving data representing an action set for the AR media communication session, the action set including a collection of one or more actions that can be performed during the AR media communication session to request an input device state, create action spaces, or control haptic events;

means for determining one or more user interactions of a user with a virtual scene, the one or more user interactions including head movements defining a pose of the user and interactions with an input device;

means for receiving data to perform at least one of the one or more actions to request the input device state, create action spaces, or control haptic events;

means for constructing one or more packets including data for the AR media communication session, the data including pose information for a pose of a participant in the AR media communication session corresponding to the one or more user interactions, and when the data to perform the at least one of the one or more actions includes data to request the input device state, the data indicates the input device state based on the interactions with the input device; and means for sending the one or more packets to a device involved in the media communication session.

30. A non-transitory computer-readable storage medium having stored thereon instructions that, when executed, cause a processor of a client device to:

initialize an augmented reality (AR) media communication session performed using WebRTC, wherein the instructions that cause the processor to initialize the AR media communication session include instructions that cause the processor to receive data representing an action set for the AR media communication session, the action set including a collection of one or more actions that can be performed during the AR media communication session to request an input device state, create action spaces, or control haptic events;

determine one or more user interactions of a user with a virtual scene, the one or more user interactions including head movements defining a pose of the user and interactions with an input device;

receive data to perform at least one of the one or more actions to request the input device state, create action spaces, or control haptic events;

construct one or more packets including data for the AR media communication session, the data including pose information for a pose of a participant in the AR media communication session corresponding to the one or more user interactions, and when the data to perform the at least one of the one or more actions includes data to request the input device state, to include data indicative of the input device state based on the interactions with the input device; and send the one or more packets to a device involved in the media communication session.

\* \* \* \* \*